US011515639B2

(12) United States Patent
Pelletti et al.

(10) Patent No.: US 11,515,639 B2
(45) Date of Patent: Nov. 29, 2022

(54) METHOD AND APPARATUS FOR AN ACTIVE RADIATING AND FEED STRUCTURE

(71) Applicant: Metawave Corporation, Carlsbad, CA (US)

(72) Inventors: Chiara Pelletti, San Francisco, CA (US); Yan Wang, Davis, CA (US); George Daniel, San Francisco, CA (US); Maha Achour, Encinitas, CA (US)

( * ) Notice: Subject to any disclaimer, the term of this patent is extended or adjusted under 35 U.S.C. 154(b) by 123 days.

(21) Appl. No.: 16/756,460

(22) PCT Filed: Oct. 15, 2018

(86) PCT No.: PCT/US2018/055962
§ 371 (c)(1),
(2) Date: Apr. 15, 2020

(87) PCT Pub. No.: WO2019/075488
PCT Pub. Date: Apr. 18, 2019

(65) Prior Publication Data
US 2021/0210858 A1    Jul. 8, 2021

Related U.S. Application Data

(60) Provisional application No. 62/572,477, filed on Oct. 15, 2017.

(51) Int. Cl.
*H01Q 1/36* (2006.01)
*H01Q 15/00* (2006.01)
(Continued)

(52) U.S. Cl.
CPC ....... *H01Q 15/0086* (2013.01); *G01S 7/4056* (2013.01); *H01Q 13/10* (2013.01);
(Continued)

(58) Field of Classification Search
CPC ...... H01Q 15/0086; H01Q 13/10; H01Q 3/34; H01Q 1/364; H01Q 21/064; H01Q 1/3233; G01S 7/4056
See application file for complete search history.

(56) References Cited

U.S. PATENT DOCUMENTS 6,650,290 B1   11/2003   Chang et al.
7,250,908 B2    7/2007   Weiss et al.
(Continued)

OTHER PUBLICATIONS

L. Boccia, et al., "Multilayer Antenna-Filter Antenna for Beam-Steering Transmit-Array Applications," IEEE Trans. on Microwave Theory and Techniques, vol. 60, No. 7, pp. 2287-2300, Jul. 2012.
(Continued)

*Primary Examiner* — Joseph J Lauture
(74) *Attorney, Agent, or Firm* — Sandra Lynn Godsey

(57) ABSTRACT

Examples disclosed herein relate to a radiating structure. The radiating structure has a transmission array structure having a plurality of transmission paths with each transmission path having a plurality of slots and a pair of adjacent transmission paths forming a superelement. Each superelement has a phase control module to control a phase of a transmission signal. The radiating structure also includes a radiating array structure having a plurality of radiating elements configured in a lattice, with each radiating element corresponding to at least one slot from the plurality of slots and the radiating array structure positioned proximate the transmission array structure. A feed coupling structure is coupled to the transmission array structure and adapted for propagation of a transmission signal to the transmission array structure. The transmission signal is radiated through at least one superelement and at least one of the plurality of radiating elements and has a phase controlled by the phase control module in the at least one superelement.

20 Claims, 19 Drawing Sheets

(51) Int. Cl.
*G01S 7/40* (2006.01)
*H01Q 13/10* (2006.01)
*H01Q 21/06* (2006.01)
*H01Q 1/32* (2006.01)
*H01Q 3/34* (2006.01)

(52) U.S. Cl.
CPC .......... *H01Q 1/3233* (2013.01); *H01Q 1/364* (2013.01); *H01Q 3/34* (2013.01); *H01Q 21/064* (2013.01)

(56) References Cited

U.S. PATENT DOCUMENTS

| | | | |
|---|---|---|---|
| 7,847,739 | B2 | 12/2010 | Achour et al. |
| 8,633,866 | B2 | 1/2014 | Sarabandi et al. |
| 9,545,923 | B2 | 1/2017 | Casse et al. |
| 2015/0022421 | A1 | 1/2015 | Vigano et al. |
| 2016/0013531 | A1 | 1/2016 | Casse et al. |
| 2018/0351250 | A1* | 12/2018 | Achour ............... G01S 7/03 |
| 2019/0074588 | A1 | 3/2019 | Scarborough et al. |

OTHER PUBLICATIONS

C.A. Allen, et al., "Leaky-Waves in a Metamaterial-Based Two-Dimensional Structure for a Conical Beam Antenna Application," IEEE MTT-S International Microwave Symposium Digest, Fort Worth, TX, pp. 305-308, Jun. 2004.

E.A. Firouzjaei, "mm-Wave Phase Shifters and Switches," Technical Report No. UCB/EECS-2010-163, Electrical Engineering and Computer Sciences, University of California at Berkeley, Berkeley, CA, USA, Dec. 2010.

A.H. Abdelrahman, et al., "Transmission Phase Limit of Multilayer Frequency-Selective Surfaces for Transmitarray Designs," IEEE Trans. on Antennas and Propagation, vol. 62, No. 2, pp. 690-697, Feb. 2014.

C. Tripon-Canseliet, et al., "Contribution of MetaMaterials to Improvement of Scan Performance and Reconfigurability of Phased Array Antennas," International Radar Conference, Lille, France, pp. 1-3, Oct. 2014.

J.Y. Lau, "Reconfigurable Transmitarray Antennas," Ph.D. dissertation, Dept. of Electrical and Computer Eng., Univ. of Toronto, Toronto, Canada, 2012.

J. Zeng, et al., "High-Isolation, Low Cross-Polarization, Differential-Feed, Dual-Polarized Patch Antenna Array for a 2.45 GHz Retrodirective System Application," IEEE International Symposium on Antennas and Propagation and USNC-URSI Radio Science Meeting, Atlanta, GA, pp. 869-870, Jul. 2019.

R. Valkonen, "Analysis and Design of mm-Wave Phased Array Antennas for 5G Access," IEEE International Symposium on Antennas and Propagation and USNC-URSI Radio Science Meeting, Atlanta, GA, pp. 611-612, Jul. 2019.

J. Lau, et al., "Design and Characterization of a 6×6 Planar Reconfigurable Transmitarray," in Proc. of the 2010 European Conference on Antennas and Propagation (EuCAP), Apr. 2010.

R. Lovato, et al., "A Substrate Integrated Waveguide Filtering Slot Antenna Array," IEEE International Symposium on Antennas and Propagation and USNC-URSI Radio Science Meeting, Atlanta, GA, pp. 1235-1236, Jul. 2019.

A. Ourir, et al., "Electromagnetically Induced Transparency in Symmetric Planar Metamaterial at THz Wavelengths," Photonics, vol. 2, pp. 308-316, Mar. 2015.

* cited by examiner

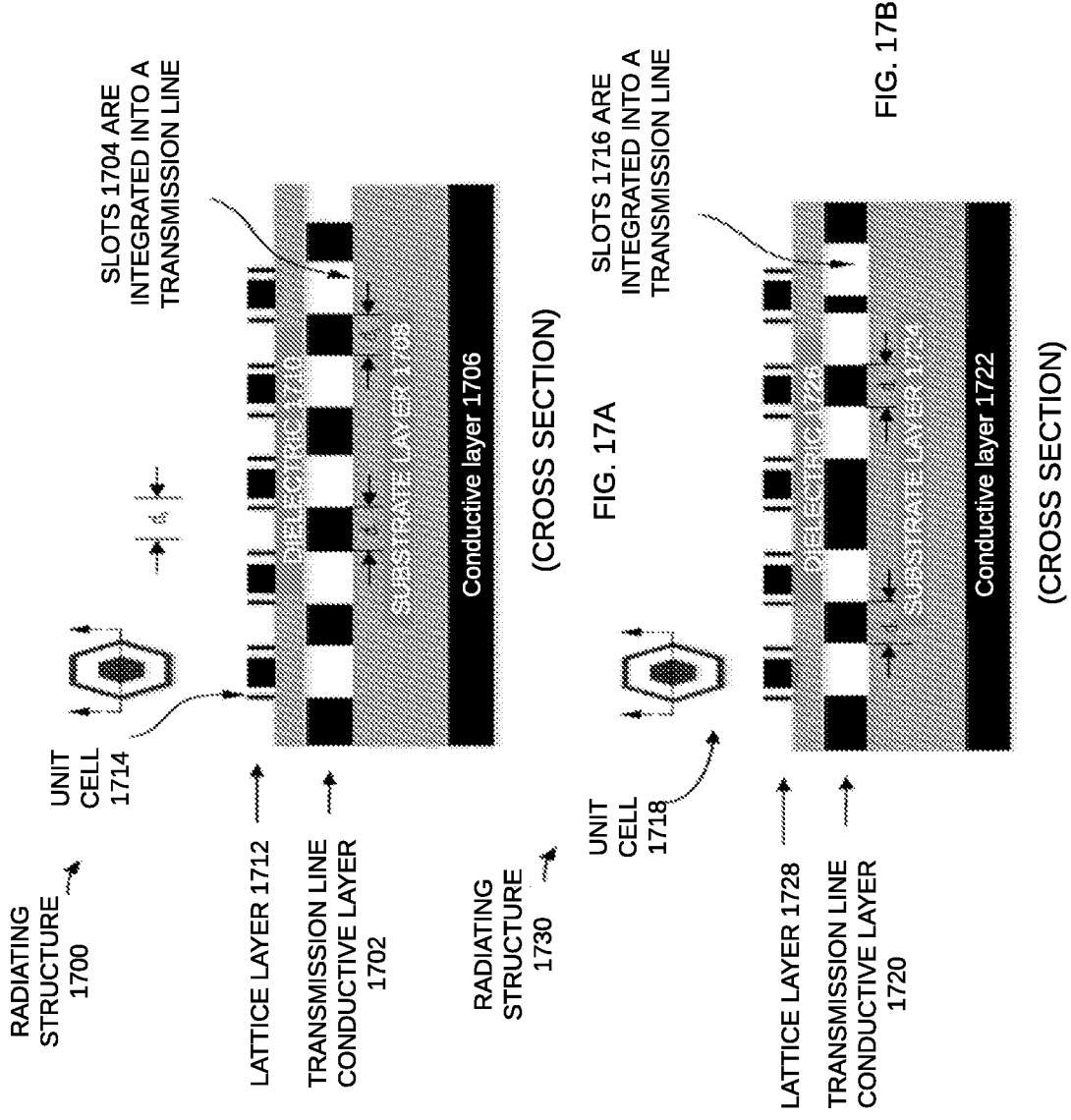

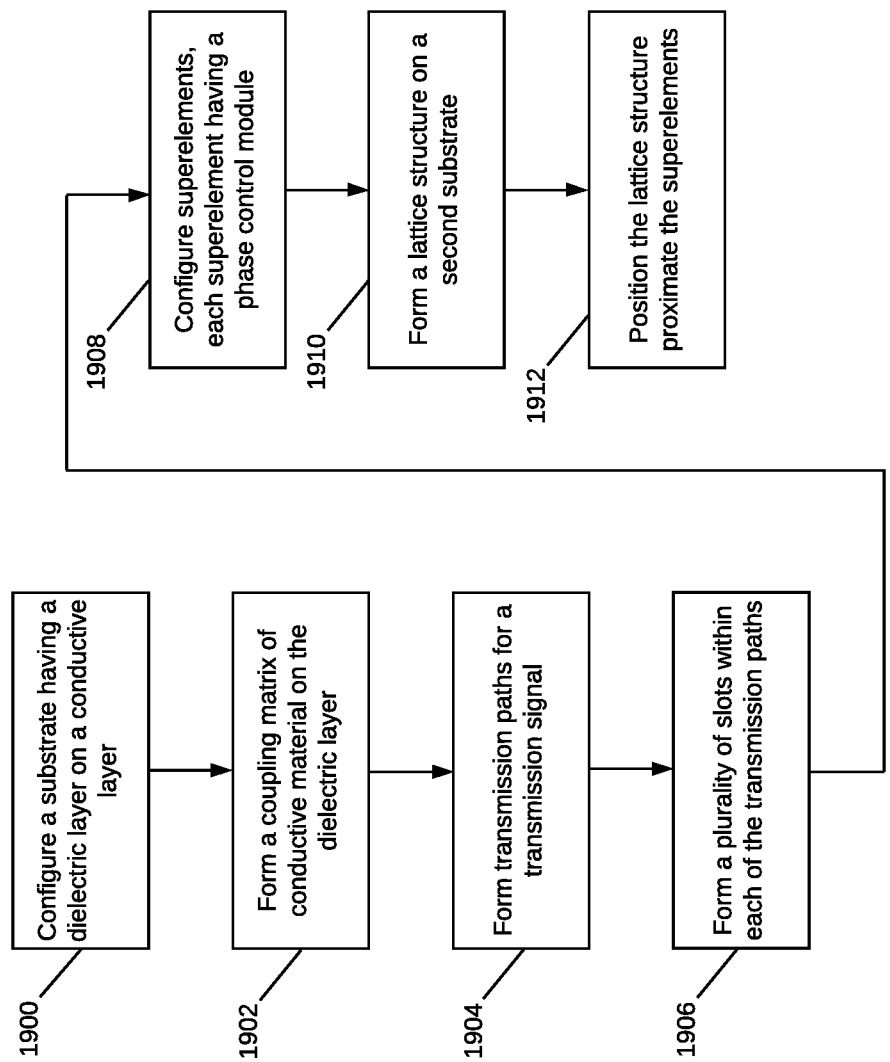

METHOD AND APPARATUS FOR AN ACTIVE RADIATING AND FEED STRUCTURE

CROSS-REFERENCE TO RELATED APPLICATIONS

This application claims priority to U.S. Provisional Application No. 62/572,477, filed on Oct. 15, 2017, and incorporated herein by reference.

BACKGROUND

As wireless systems and infrastructures are strained, and poised to reach limits, there is a need for systems and designs that meet these challenges. Similarly, from driver-assisted to autonomous vehicles, there is a need for advanced sensing and detection at millimeter wave frequencies and under challenging conditions. Developing devices that operate under these constraints and within these frequencies is challenging. Current solutions do not meet the scan speed, scan angle, long range and phase shifting capabilities required. This is true for advanced and developing wireless communications systems, which also seek to direct communications to an individual user.

BRIEF DESCRIPTION OF THE DRAWINGS

The present application may be more fully appreciated in connection with the following detailed description taken in conjunction with the accompanying drawings, which are not drawn to scale, and in which like reference characters refer to like parts throughout, and in which:

FIG. 16 illustrates a layout of a portion of a radiating structure on a composite layer in accordance with various examples;

FIGS. 17A-B illustrates cross-sections of a transmission line array portion of a radiating structure in accordance with various examples;

FIG. 19 is a flowchart for manufacturing a radiating structure in accordance with various examples.

DETAILED DESCRIPTION

Methods and apparatuses for an active radiating and feed structure are disclosed. The active radiating and feed structure is suitable for many different millimeter wave ("mm-wave") applications and can be deployed in a variety of different environments and configurations. Mm-wave applications are those operating with frequencies between 30 and 300 GHz or a portion thereof, including autonomous driving applications in the 77 GHz range and 5G applications in the 60 GHz range, among others. The active radiating and feed structure disclosed herein provides antennas with unprecedented capability of generating radio frequency ("RF") waves with improved directivity in both 5G and autonomous driving applications. Active components in the antennas are used to achieve smart beam steering and beam forming, reducing the antennas' complexity and processing time and enabling fast scans of up to approximately a 360° Field-of-View ("FoV") for long range target detection.

It is appreciated that, in the following description, numerous specific details are set forth to provide a thorough understanding of the examples. However, it is appreciated that the examples may be practiced without limitation to these specific details. In other instances, well-known methods and structures may not be described in detail to avoid unnecessarily obscuring the description of the examples. Also, the examples may be used in combination with each other.

Figure 1:
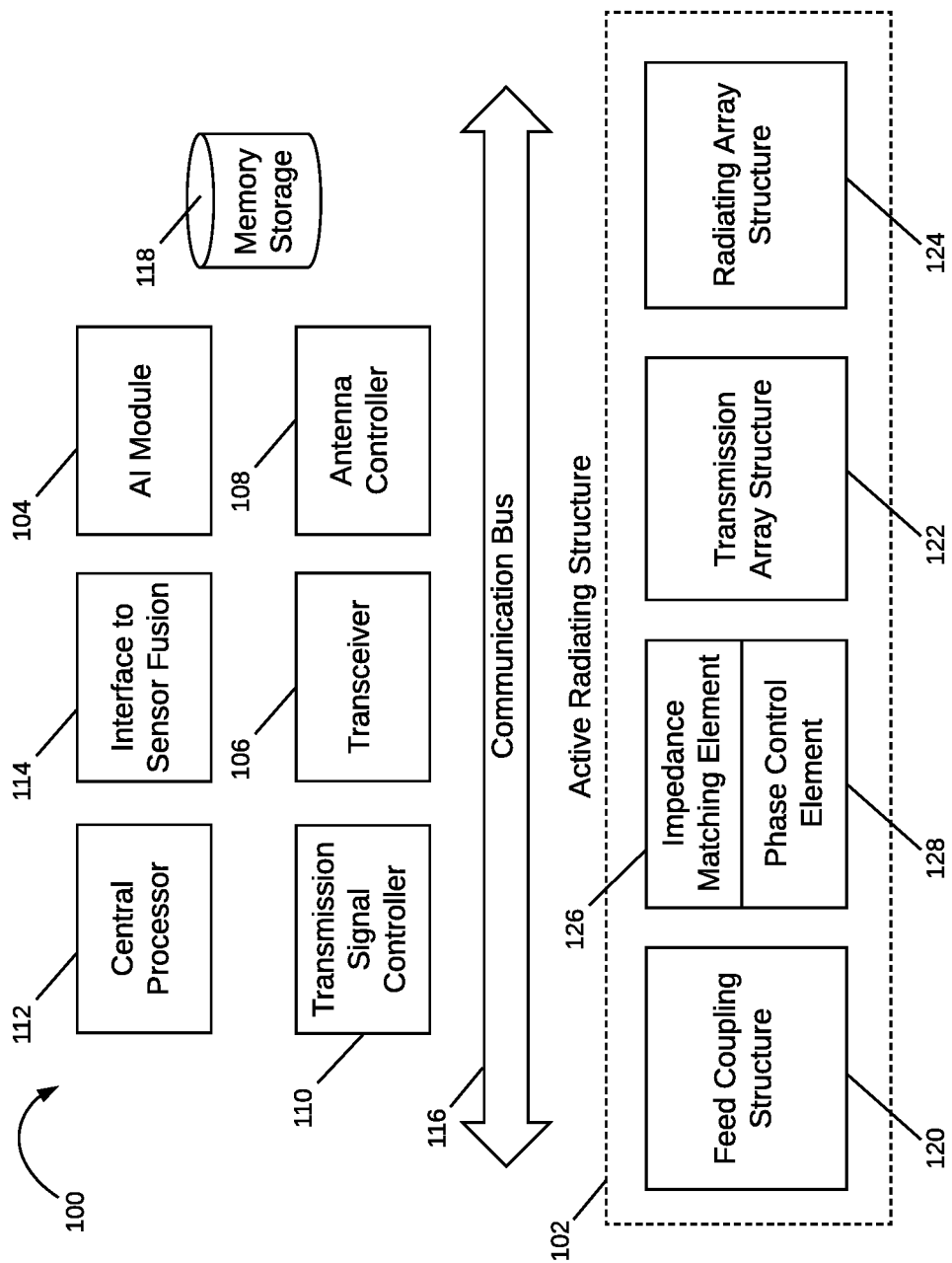
FIG. 1 illustrates a system having a radiating structure or device in accordance with various examples.

FIG. 1 illustrates a system having a radiating structure or device in accordance with various examples. System 100 is a "digital eye" with true 3D vision and capable of a human-like interpretation of the world. The "digital eye" and human-like interpretation capabilities are provided by two main modules: radiating structure 102 and AI module 104. Radiating structure 102 is capable of radiating dynamically controllable and highly-directive RF beams. Radiating structure 102 has a feed coupling structure 120, a transmission array structure 122, and a radiating array structure 124. Radiating structure 102 also has an impedance matching element 126 and a phase control element 128. The impedance matching element 126 and the phase control element 128 may be positioned within the architecture of feed coupling structure 120. Alternatively, one or both may be external to the feed coupling structure 120 for manufacture or composition as an antenna or radar module. The impedance matching element 126 works in coordination with the phase control element 128 to provide phase shifting of the radiating signal(s) from radiating array structure 126. The feed coupling structure 120 is a novel feed structure having a plurality of transmission lines. The transmission array structure 122 is configured with discontinuities in transmission lines within a conductive material. And the radiating array structure 124 is a lattice structure of unit cell radiating elements proximate the transmission lines and discontinuities. The feed coupling structure 120 includes a coupling module for providing an input signal to the transmission lines, or a portion of the transmission lines.

The present examples illustrate the flexibility and robust design of the system 100 in antenna and radar design. The system 100 is a dramatic contrast to the traditional complex systems incorporating multiple antennas controlled by digital beam forming. The system 100 increases the speed and flexibility of conventional systems, while reducing the footprint and expanding performance. In some examples, the feed coupling structure 120 is a power divider structure that divides the signal among a plurality of N transmission lines, wherein the power may be distributed equally among the N transmission lines or may be distributed according to another scheme, wherein the N transmission lines do not all receive a same signal strength. The impedance matching element 126 includes a directional coupler having an input port to each of adjacent transmission lines. Adjacent transmission lines and the impedance matching element 126 and phase control element 128 form a superelement, wherein the adjacent transmission line pair has a specific phase difference, such as a 90° phase difference with respect to each other. The impedance matching element 126 and phase control element 128 may be a part of a superelement control module to control the phase and impedance of each superelement.

In some examples, a reactance control mechanism or device is also incorporated in the radiating array structure 124 to adjust the effective reactance of radiating element and therefore the phase of the beams radiated from the radiating element. Such a reactance control mechanism or device may be a varactor diode having a bias voltage applied by antenna controller 108. The varactor diode acts as a variable capacitor when a reverse bias voltage is applied. As used herein, the reverse bias voltage is also referred to as a capacitor control voltage or varactor voltage. The value of the capacitance is a function of the reverse bias voltage value. By changing the capacitor control voltage, the capacitance of the varactor diode is changed over a given range of values. Alternate examples may use alternate methods for changing the reactance of a radiating element, which may be electrically or mechanically controlled. In various examples, a varactor diode is coupled between conductive areas of a radiating element. With respect to the radiating element, changes in varactor voltage produce changes in the effective capacitance of the radiating element. The change in effective capacitance changes the behavior of the radiating element and in this way the varactor may be considered as a tuning element for the radiating elements in beam formation.

The reactance control mechanism enables control of the reactance of a fixed geometric structure. The fixed geometric structure is embodied in a radiating element in radiating array structure 124, such as, for example, a hexagonal radiating element. Alternate examples may implement alternate radiating elements, alternate shapes, and alternate materials. In some examples, these structures may not maintain a fixed geometric structure but are dynamically adjusted. The examples presented herein are hexagonal, parametric shapes that enable dense coupling and configurations while reducing the complexity of control. The radiating element may be any of a variety of shapes and configurations. For the present discussion, the radiating elements are a hexagonal-based shape as discussed herein. The present examples enable increased phase swings in forming radiation beams, which create a larger total field of view for radiating structure 102.

When a transmission signal is provided to the radiating structure 102, such as through circuitry, a coaxial cable, a wave guide, or other type of a signal feed connector, the signal propagates through the feed coupling structure 120 to the transmission array structure 122 and then to radiating array structure 124 for transmission through the air as a radio frequency ("RF") beam. The impedance matching element 126 is configured to match the input signal parameters with radiating elements in the radiating array structure 124. There are a variety of configurations and locations for this radiating element, which may include a plurality of components. A variety of signals may be provided to the radiating structure 102 for transmission, such as from a transmission signal controller 110 through a transceiver 106. In an example application, the radiating structure 102 can be implemented in a radar sensor for use in a driver-assisted or autonomous vehicle.

The transmission signal may be a Frequency Modulated Continuous Wave ("FMCW") signal, which is used for radar sensor applications as the transmitted signal is modulated in frequency, or phase. The FMCW signal enables a radar to measure range to a target by measuring timing and phase differences in phase or frequency between the transmitted signal and the received or reflected signal. Within FMCW formats, there are a variety of modulation patterns that may be used within FMCW, including triangular, sawtooth, rectangular and so forth, each having advantages, challenges, and application for various purposes. For example, sawtooth modulation may be selected for use when detection involves large distances to a target, i.e., long range. In some examples, the shape of the wave form provides speed and velocity information based on the Doppler shift between signals. This information enables construction of a range-Doppler map to indicate a location and movement of a detected object. As used herein, a target is any object detected by the radar, but may also refer to a specific type of object, e.g., a vehicle, a person, a road sign, and so on.

In another example application, the radiating structure 102 is applicable in a wireless communication or cellular system, implementing user tracking from a base station, fixed wireless location, and so on, or function as a wireless relay to provide expanded coverage to users in a wireless network. The transmission signal in cellular communications is a coded signal, such as a cellular modulated Orthogonal Frequency Division Multiplexed ("OFDM") signal. Other types of signals may also be used with radiating structure 102, depending on the desired application.

Transceiver module 106 coupled to the radiating structure 102 prepares a signal for transmission, wherein the signal is defined by modulation and frequency. The signal is provided to the radiating structure 102 through a coaxial cable or other connector and propagates through the radiating structure 102 for transmission through the air via RF beams at a given phase and direction. The RF beams and their parameters (e.g., beam width, phase, azimuth and elevation angles, etc.) are controlled by antenna controller 108, such as at the direction of AI module 104. The RF beams reflect off of targets and the RF reflections are received by the transceiver module 106. Radar data from the received RF beams is provided to the AI module 104 for target detection and identification. The radar data may be organized in sets of Range-Doppler ("RD") map information, corresponding to 4D information that is determined by each RF beam radiated off of targets, such as azimuthal angles, elevation angles, range, and velocity. The RD maps may be extracted from FMCW radar pulses and contain both noise and systematic artifacts from Fourier analysis of the pulses. The AI module 104 may control further operation of the radiating structure 102 by, for example, providing beam parameters for the next RF beams to be radiated from the radiating structure 102.

In operation, the antenna controller 108 is responsible for directing the radiating structure 102 to generate RF beams with determined parameters such as beam width, transmit angle, and so on. The antenna controller 108 may, for example, determine the parameters at the direction of the AI module 104, which may at any given time want to focus on a specific area of an FoV upon identifying targets of interest in a vehicle's path or surrounding environment. The antenna controller 108 determines the direction, power, and other parameters of the beams and controls the radiating structure 102 to achieve beam steering in various directions. The antenna controller 108 also determines a voltage matrix to apply to reactance control mechanisms or devices in radiating structure 102 to achieve a given phase shift. In various examples, the radiating structure 102 is adapted to transmit a directional beam through active control of the reactance parameters of individual radiating elements in radiating array structure 124. The radiating structure 102 radiates RF beams having the determined parameters. The RF beams are reflected off of targets (e.g., in a 360° FoV) and are received by the transceiver module 106.

In various examples described herein, the use of system 100 in an autonomous driving vehicle provides a reliable way to detect targets in difficult weather conditions. For example, historically a driver will slow down dramatically in thick fog, as the driving speed decreases with decreases in visibility. On a highway in Europe, for example, where the speed limit is 115 km/h, a driver may need to slow down to 40 km/h when visibility is poor. Using the radar system 100, the driver (or driverless vehicle) may maintain the maximum safe speed without regard to the weather conditions. Even if other drivers slow down, a vehicle enabled with the system 100 will be able to detect those slow-moving vehicles and obstacles in the way and avoid/navigate around them.

Additionally, in highly congested areas, it is necessary for an autonomous vehicle to detect objects in sufficient time to react and take action. The examples provided herein for system 100 increase the sweep time of a radar signal so as to detect any echoes in time to react. In rural areas and other areas with few obstacles during travel, the system 100 adjusts the focus of the beam to a larger beam width, thereby enabling a faster scan of areas where there are few echoes. The AI module 104 may detect this situation by evaluating the number of echoes received within a given time period and making beam size adjustments accordingly. Once a target is detected, the AI module 104 determines how to adjust the beam focus. This is achieved by changing the specific configurations and conditions of the radiating structure 102.

All of these detection scenarios, analysis and reactions may be stored in the AI module 104 and used for later analysis or simplified reactions. For example, if there is an increase in the echoes received at a given time of day or on a specific highway, that information is fed into the antenna controller 108 to assist in proactive preparation and configuration of the radiating structure 102.

In operation, the antenna controller 108 receives information from AI module 104 or other modules in system 100 indicating a next radiation beam, wherein a radiation beam may be specified by parameters such as beam width, transmit angle, transmit direction and so forth. The antenna controller 108 determines a voltage matrix to apply to phase control element 128 or reactance control devices in radiating array structure 124 to achieve a given phase shift or other parameters. In these examples, the radiating structure 102 is adapted to transmit a directional beam without using digital beam forming methods, but rather through active control of the reactance parameters of the individual radiating elements that make up radiating array structure 124. In one example scenario, the voltages on the phase control element 128 or reactance control devices in radiating array structure 124 are adjusted. In other examples, the individual radiating elements may be configured into subarrays that have specific characteristics. This configuration means that this subarray may be treated as a single unit, and all the reactance control devices are adjusted similarly. In another scenario, the subarray is changed to include a different number of radiating elements, where the combination of radiating elements in a subarray may be changed dynamically to adjust to conditions and operation of the system 100.

Figure 2:
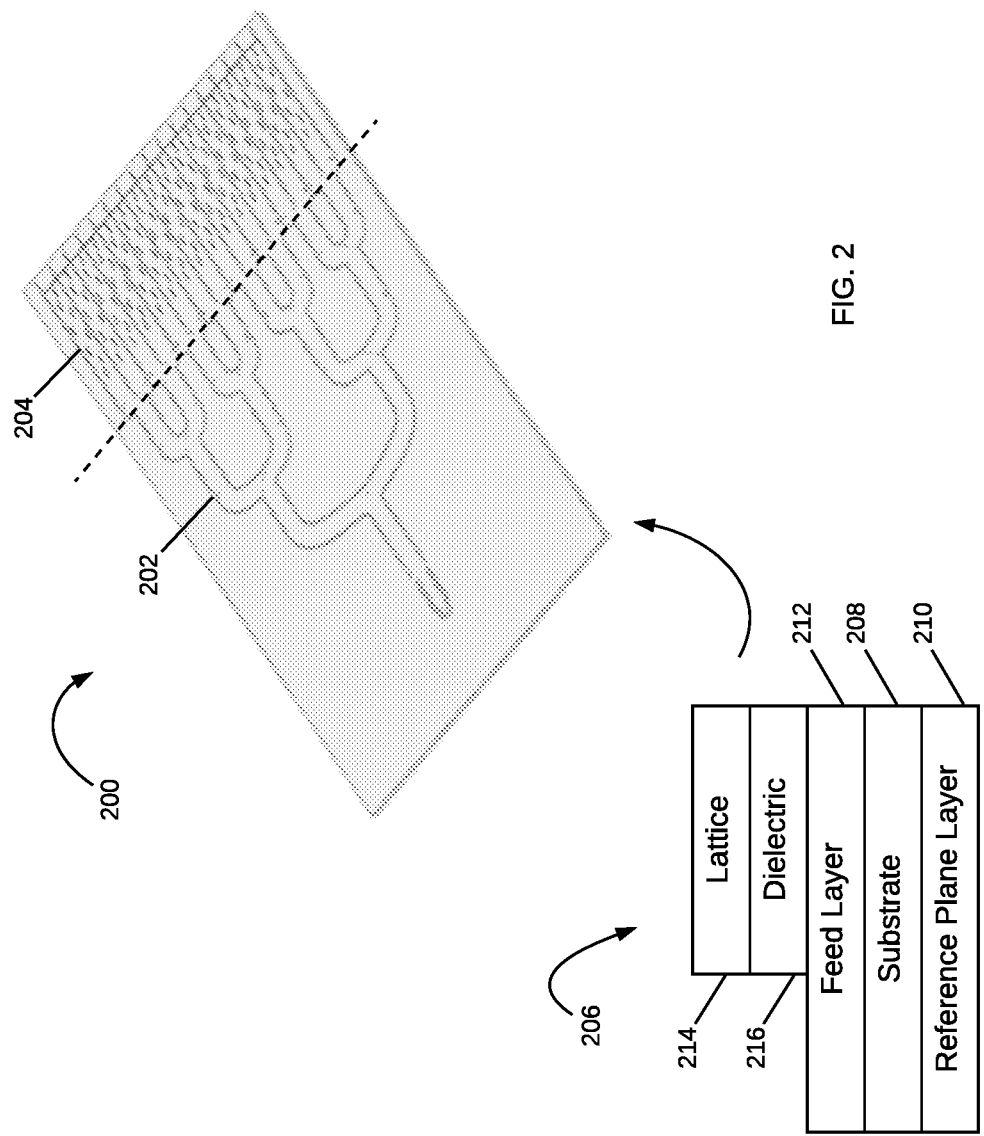
FIG. 2 is perspective view of an example radiating structure having a feed coupling structure and a radiating array structure as in FIG. 1.

Each of the structures 120-124 in radiating structure 102 is now described in more detail. FIG. 2 is perspective view of an example radiating structure 200 having a feed coupling structure and a radiating array structure as in FIG. 1. The feed coupling structure 202 extends and couples to the transmission array structure 204. The radiating array structure of this example (not shown) is configured as a lattice of unit cell radiating elements. The unit cells are metamaterial ("MTM") artificially engineered conductive structures that act to radiate and/or receive the transmission signal. The lattice structure is positioned proximate the transmission array structure 204 such that the signal fed into the transmission lines of the transmission array structure 204 are received at the lattice.

An inset image 206 illustrates the composition of the radiating structure 200 having a dielectric substrate layer 208, with a reference plane layer 210 on one side and a feed layer 212 on the opposite layer. The feed layer 212 includes the feed coupling structure 202 and the transmission line array structure 204. The lattice layer 214 is positioned proximate the feed layer 212, having a separation layer 216 therebetween.

As illustrated, the transmission array structure 204 is positioned below the radiating array structure (not shown). The transmission lines include discontinuity elements that act similar to slot antenna elements. The transmission array structure 204 is positioned such that discontinuity elements of the transmission array structure 204 correspond to specific unit cells of the radiating array structure. In some examples, the radiating array structure is made up of a lattice of repeating hexagonal elements. Each hexagonal element is designed to radiate at the transmission signal frequency, wherein each hexagonal element is the same size and shape. The signal radiating from a given element, or group of elements, radiates at a specific phase that is controlled by phase control element 128, which may be a variable capacitive diode, or varactor. In such examples, a varactor in a radiating element changes its reactance behavior to achieve a phase change or shift. The varactor is controlled by antenna controller 108, which adjusts a voltage on the varactor to achieve the resultant capacitance change of the radiating element. The phase control element 128 may be a set of varactors to control a superelement or may be configured within the feed coupling structure 202 and/or the transmission array structure 204.

Figure 3:
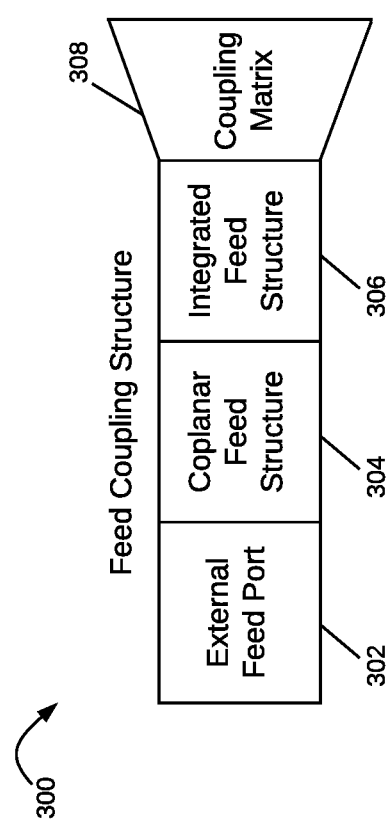
FIG. 3 is a schematic diagram of an example feed coupling structure for use in a radiating structure as in FIG. 1.

Attention is now directed to FIG. 3, which is a schematic diagram of an example feed coupling structure for use in the radiating structure of FIG. 1. The feed coupling structure 120 of FIG. 1 in some examples acts to divide received power along a network of transmission lines. The power division may be to support propagation of a received signal for transmission to the radiating array structure 124 of FIG. 1, such as for transmitting signals over the air, where the radiating array structure 124 acts as a transmit antenna. The power division may also be to support propagation of energy received at the radiating array structure 124 to other parts of the system 100, where the radiating array structure 124 acts as a receive antenna.

Feed coupling structure 300 includes an external feed port 302 adapted to receive a transmission signal such as by way of a coaxial cable or other signal source. The external feed port 302 interfaces with coplanar feed structure 304 for propagation of the received transmission signal. The coplanar feed structure 304 then interfaces with the integrated feed structure 306, which is integrated within a substrate, wherein the received transmission signal propagates through the substrate to the coupling matrix 308. The integrated feed structure 306 includes transmission paths along the substrate through which the transmission signal propagates and may include vias through the substrate to form wave guide structures in order to maintain the transmission signal within the transmission paths of the integrated feed structure 306. Such vias prevent the transmission signal from significantly propagating out of the integrated feed structure 306. The coupling matrix 308 couples the integrated feed structure 306 with the transmission array structure 122 of FIG. 1. The coupling matrix 308 is configured to distribute a received transmission signal to a plurality of transmission paths of the transmission array structure 122 of FIG. 1. The coupling matrix 308 divides the energy of the transmission signal, such that each of the transmission paths receives a substantially equal portion of the signal. In some examples, this distribution may not be equally divided, such as to taper the transmissions at certain points of the transmission array structure 122 of FIG. 1.

Figure 4:
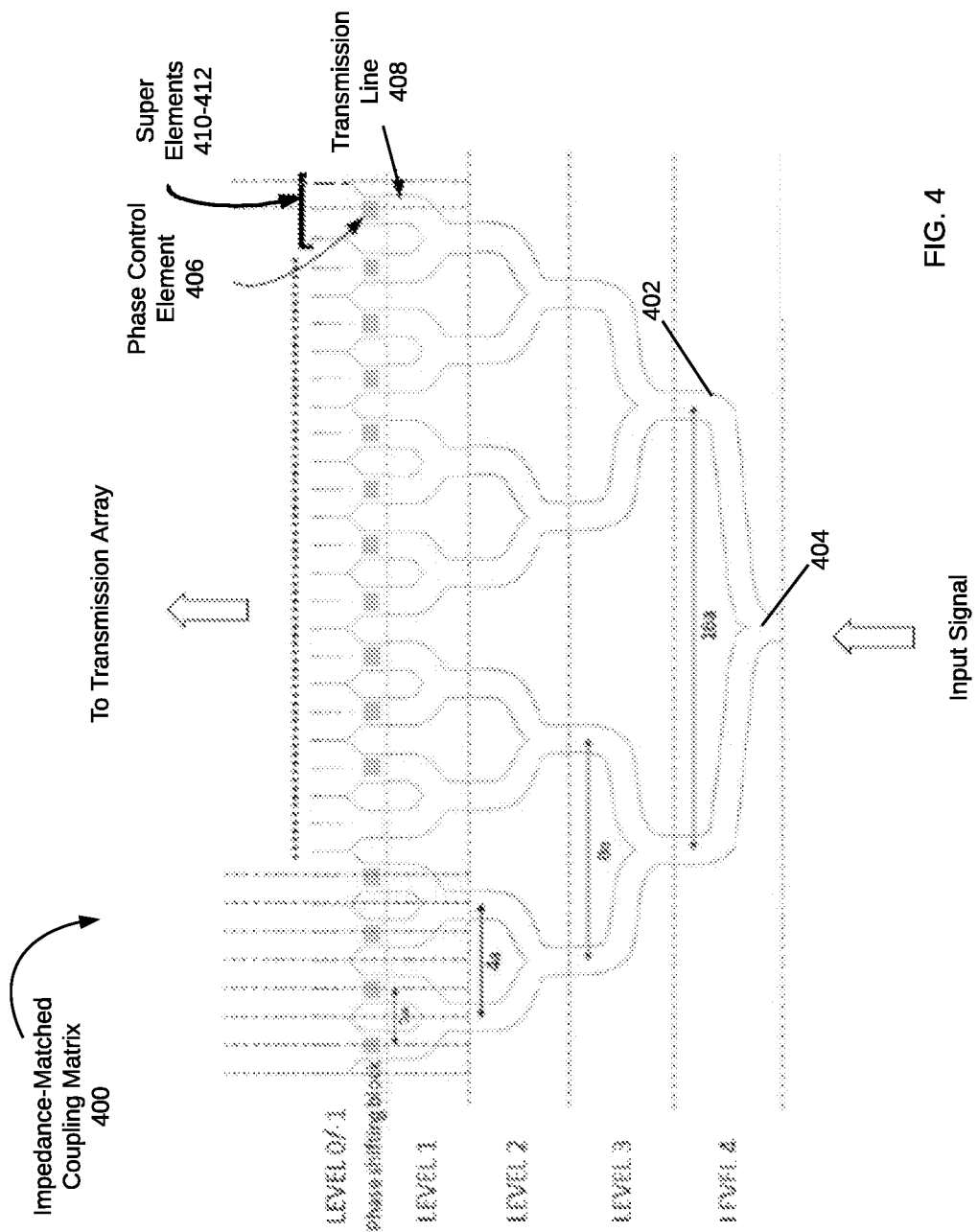
FIG. 4 illustrates an example coupling matrix for use in a feed coupling structure as in FIG. 2.

An example coupling matrix 308 for use in the feed coupling structure 300 is illustrated in FIG. 4. The coupling matrix 400 is a type of a power divider circuit such that it takes an input signal and divides it through a network of coupling paths or transmission lines 402 that are formed from vias in the substrate. These vias extend through a second conductive layer in the substrate and are lined, or plated, with conductive material. The coupling paths 402 act to distribute the received transmission signal to the transmission array structure 122 of FIG. 1. Each coupling path may have similar dimensions; however, the size of the paths may be configured to achieve a desired transmission and/or radiation result. In various examples, the coupling matrix 400 is designed to be impedance-matched, such that the impedances at each end of a transmission line/coupling patch matches the characteristic impedance of the line. Matching vias such as matching via 404 are incorporated in the coupling paths to improve impedance matching.

In the illustrated example, there are 32 coupling paths, corresponding to 32 transmission array elements. Alternate examples may use traditional or other waveguide structures or transmission signal guide structures. Coupling matrix 400 has 5 levels, wherein in each level the coupling paths are doubled: level 4 has 2 paths, level 3 has 4 paths, level 2 has 8 paths, level 1 has 16 paths, and level 0 has 32 paths. The coupling matrix 400 is designed to be impedance-matched, such that the impedances at each end of a transmission line matches the characteristic impedance of the line. The coupling matrix 400 is also designed to create superelements that include multiple transmission lines having phase differences, such as a fixed 90° phase difference between adjacent transmission lines. Each transmission line may include a phase control element, e.g., phase control element 406, to change the reactance and thus the phase of a transmission line such as transmission line 404. There are a variety of ways to couple the phase control elements to one or more transmission lines. The transmission lines of the coupling matrix 400 reside in a substrate and are coupled to superelements 408-410 of a transmission array, such that the phase control element 402 affects both superelements. In various examples, phase control element 406 may be integrated with an impedance matching element in a superelement control element to control the phase and impedance of the superelement.

Figure 5:
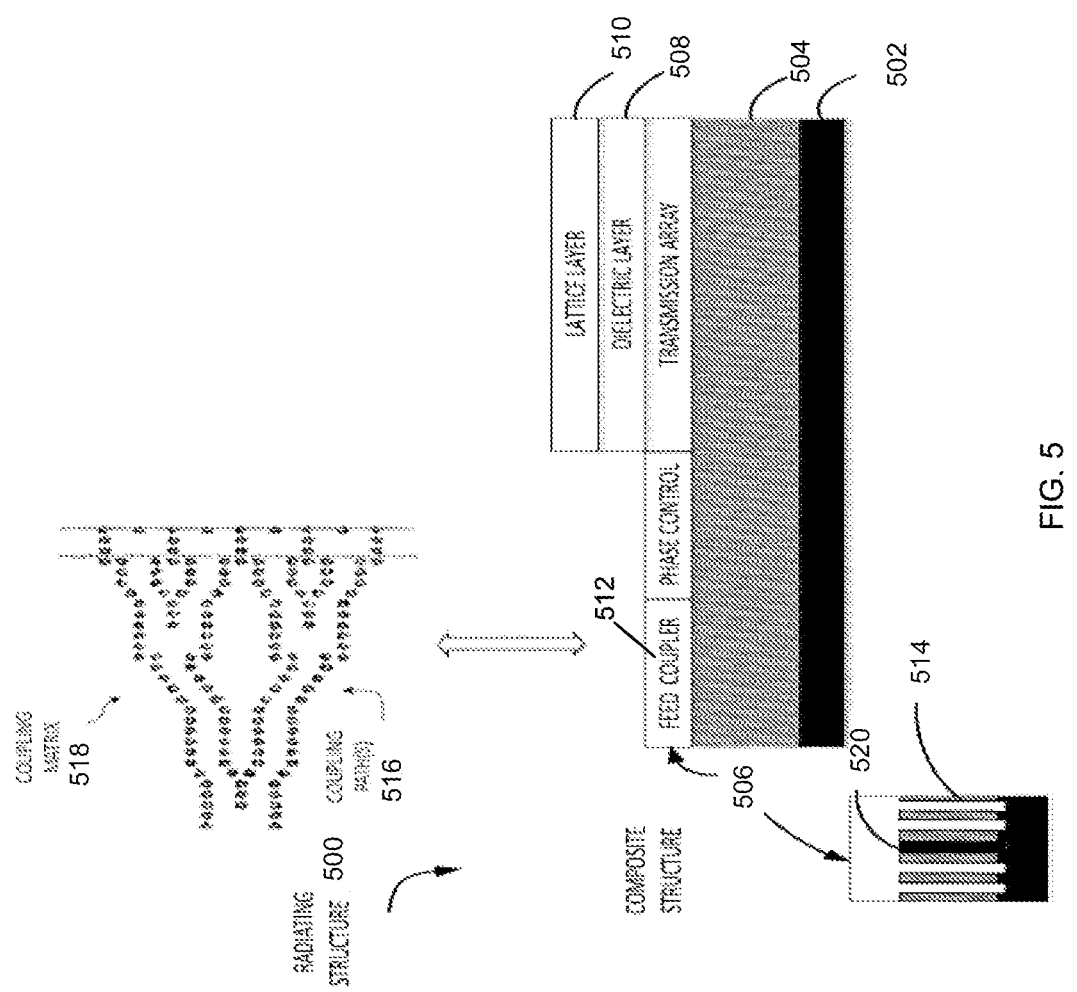
FIG. 5 illustrates a cross-sectional view of a radiating structure implemented as in FIG. 1 in accordance with various examples.

FIG. 5 illustrates a cross-sectional view of a radiating structure 500, having a conductive reference plane layer 502 coupled to a substrate layer 504. The substrate layer 504 is sandwiched between conductive reference plane layer 502 and a conductive feed layer 506, having a transmission array portion. Coupled to the transmission array portion of the feed layer 506 is a dielectric layer 508 and a lattice layer 510. The feed layer 506 includes a feed coupling structure 512 having a plurality of paths configured to distribute a transmission signal. A plurality of vias 514 are formed in the feed layer 506 through the substrate layer 504 to the conductive reference plane layer 502. The vias 514 form coupling paths 516 of the coupling matrix 518 to maintain the transmission signal within each path as it propagates through the substrate layer 504.

A cross-section of a set of vias along a given path are illustrated. Such vias prevent the transmission signal from significantly propagating out of the integrated feed structure 306 of FIG. 3 as well as to maintain the transmission signal through the coupling matrix 518. A via is used in a multiple layer, or stacked, device allowing conductive connection of elements among the layers. The via interconnects layers where the circuit pathways, or metallic traces, are separated by interlevel layers, such as dielectric layers. The vias 514 are holes through an intermediate layer, such as substrate dielectric layer 504. The vias connect the different conductive layers of the multilayer device. The vias may be lined or filled with a conductive material as to connect conductive elements on different layers.

The coupling matrix 518 couples the integrated feed structure 306 of FIG. 3 with the transmission array structure 122 of FIG. 1; the coupling matrix 518 is configured to distribute, by way of arrangements of vias, a received transmission signal to a plurality of transmission paths of the transmission array structure 122. The transmission array structure 122 is made up of an array of transmission paths bounded by a set of vias that maintain the transmission signal therein. The vias are configured as holes that pass through the substrate layer 504 to a second conductive layer or reference layer 502. In various examples, the vias are lined with conductive material and form a single conductive surface from the feed layer 506 to the reference plane layer 502. This may be conductive plating along the via surface, or it may be conductive material filling the via, e.g., via 520.

The coupling matrix 518 divides the energy of the transmission signal, such that each of the transmission paths receives an equal portion of the signal. In the illustrated example, each transmission path receives approximately one eighth (⅛) of the energy of the signal received at the external feed port 302. In other examples, the power distribution is evenly distributed among any number of transmission lines. In some examples, a coupling matrix 518 includes multiple paths of different dimensions, such that each path has a specific proportion of the received transmission signal. For example, a smaller dimension of a path may reduce the power received at a specific transmission line. In this way, the power may be concentrated on a specific portion of the transmission array and a corresponding portion of the radiating array structure 124, such as in the center portion.

Coupling matrix 518 provides paths from one or more feeds to a plurality of transmission lines, through coupling paths. Coupling paths may be formed by vias in the substrate, wherein the vias are positioned directionally to direct a transmission signal. The vias may cut through one or more layers, wherein multiple layers may have conductive portions to which a via connects. In the examples described herein, vias cut through to a second conductive layer or reference layer, and are lined, or plated, with conductive material. In some examples, the vias are filled or partially filled to create a conductive path between layers. The coupling paths act to distribute the received transmission signal to the transmission array structure, and therefore, form a tree with a number of branches sufficient to transmit signals to the transmission lines.

There are a variety of ways to build a feed coupling structure, and the illustrated example incorporates vias in a tree structure, wherein the integrated feed portion is directed out to the multiple rows. Other examples may employ other transmission methods to divide the signal. Parameters of the substrate, such as substrate 504, including dimensions and material composition may be selected to achieve a desired circuit result for a feed coupling structure.

Also illustrated in FIG. 5 is a cross-sectional view of the vias formed through substrate 504. A cross sectional view of a portion of the radiating structure 500 illustrates several via structures 514 having equal dimensions and are lined with a conductive material. The portion also includes via 520 that is filled with a conductive material. These are provided as examples of potential via configurations and make ups. In other examples, the vias may have different sizes and shapes depending on the application, design and material used. Similarly, the tree structure of coupling paths 516 are designed to propagate the signal from feed to transmission line. The coupling paths 516 are used to distribute the signal and power evenly among transmission lines to the radiating structures in radiating array structure 124. In alternate examples, coupling paths are designed to focus power through one or more of the coupling paths to one or more transmission lines. In some designs, more power is desired at the center of the transmission line array or at the perimeter transmission lines. The coupling paths form a power divider circuit and may be sized and adjusted to accommodate these designs. The coupling paths 516 illustrated are defined by vias; however alternate examples may incorporate other mechanisms for power division.

Figure 6:
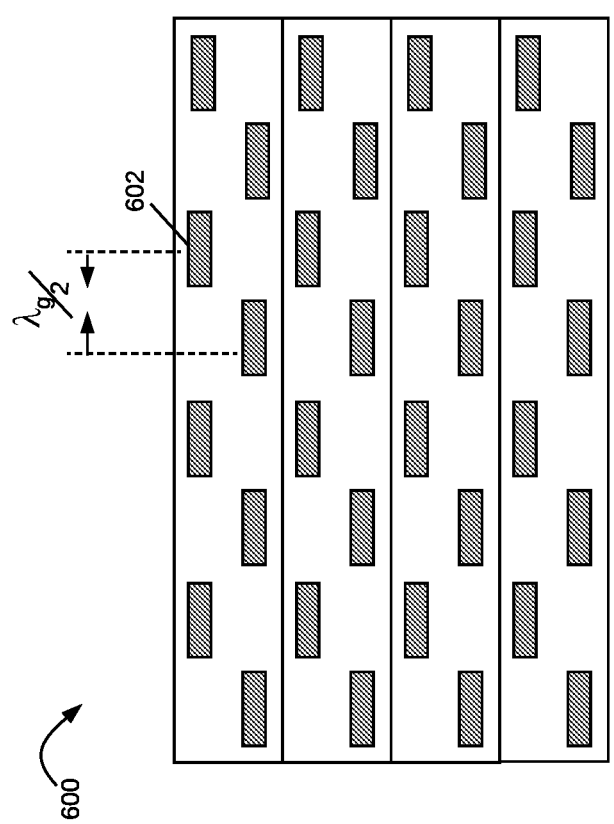
FIG. 6 is a schematic diagram of an example transmission array structure for use in a radiating structure as in FIG. 1.

Referring now to FIG. 6, a schematic diagram of an example transmission array structure for use in the radiating structure of FIG. 1 is described. The transmission array structure 600 is made up of an array of transmission paths bounded by a set of vias that maintain the transmission signal therein. The vias are configured as holes that pass through the substrate to a conductive layer or reference layer (not shown). The vias are lined with a conductive material. The transmission array structure 600 is defined by a number of superelements. As illustrated, transmission array structure 600 has four (4) superelements. Each of the superelements has multiple discontinuities, slots or openings 602, formed into the substrate, through which the propagated signal will radiate. As illustrated, there are multiple slots 602, such as the eight (8) slots illustrated per superelement, with 4 slots arranged evenly and spaced apart from the other 4 slots. The slots 602 correspond positionally to the radiating elements of the radiating array structure 124 of FIG. 1 and described in more detail below.

The propagating signal radiates through a slot 602 to a proximate radiating element, from which the signal is transmitted through the environment. The slots in the transmission array structure 600 are formed lengthwise throughout each row. Each row can be thought of as a waveguide, such as a Substrate Integrated Waveguide ("SIW"). The effective waveguide structure is bounded by conductive vias along its length and grounded at its end. The dimensions are designed such that the waveguide end is an equivalent open circuit, avoiding signal reflections. The distance between the center of a slot and the center of an adjacent equidistant slot is shown as $\lambda_g/2$, where $\lambda_g$ is the guide wavelength.

Figure 7:
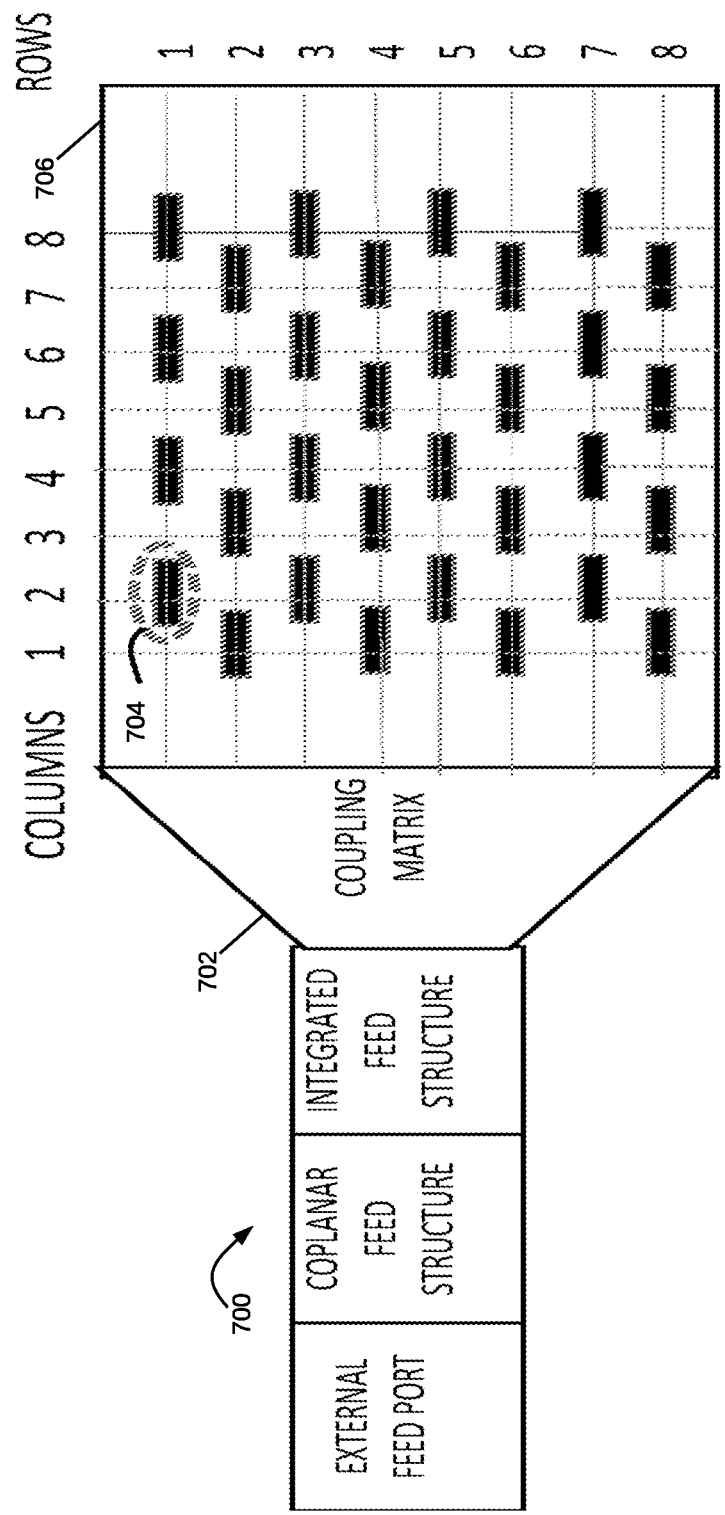
FIG. 7 illustrates a feed coupling structure as in FIG. 2 coupled to a transmission array structure as in FIG. 6 in accordance with various examples.

In another example, transmission array structure 600 is connected to a feed coupling structure as shown in FIG. 7. Feed coupling structure 700 has coupling matrix 702, which can be implemented as the example coupling matrix 308 of FIG. 3 with eight (8) coupling paths, with each coupling path providing a signal to a corresponding row of the transmission array 706. The signal radiates through the slots in the rows, e.g., slot 704, to a corresponding radiating element of a radiating array structure, e.g., radiating array structure 124 of FIG. 1.

Figure 8:
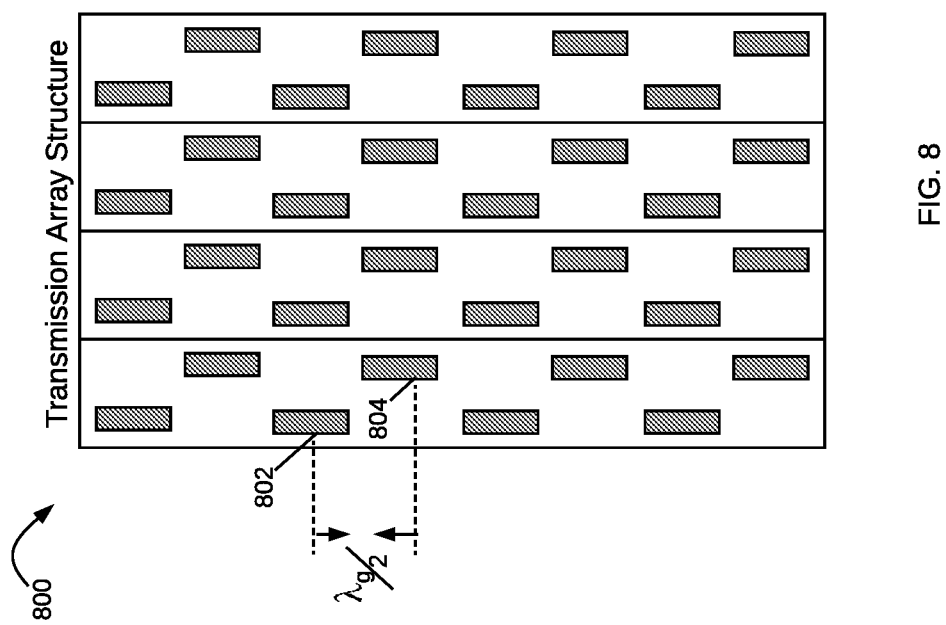
FIGS. 8-10 illustrates other examples of a transmission array structure for use in a radiating structure as in FIG. 1.

An example transmission array structure is illustrated in FIG. 8. Transmission array structure 800 has a perpendicular orientation with respect to transmission array structure 600 of FIG. 6, wherein slots are positioned along columns rather than rows. In this illustrated example, a feed coupling structure would also have a vertical orientation, with coupling paths or transmission lines of its coupling matrix supporting the propagation of transmitting signals to the columns rather than the rows of transmission array structure 800. In this example, the center of adjacent slots of transmission array structure 800, e.g., slots 802-804, are distanced by $\lambda_g/2$, where $\lambda_g$ is the guide wavelength of a waveguide along a column of transmission array structure 800.

Figure 9:
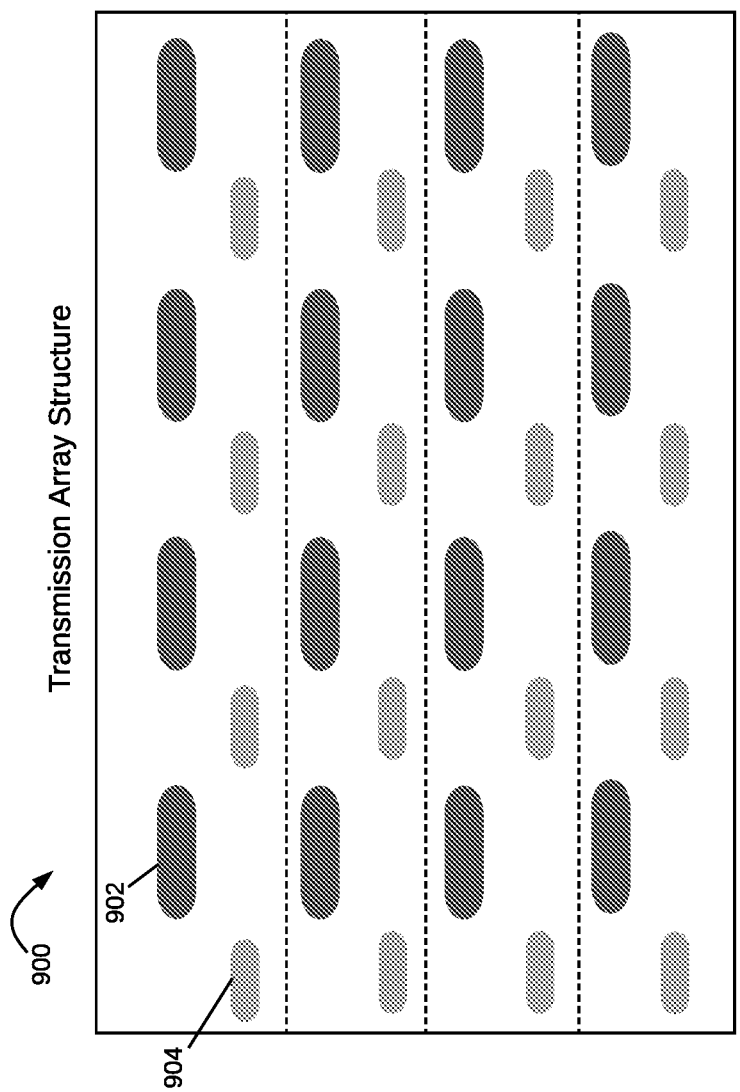
Figure 10:
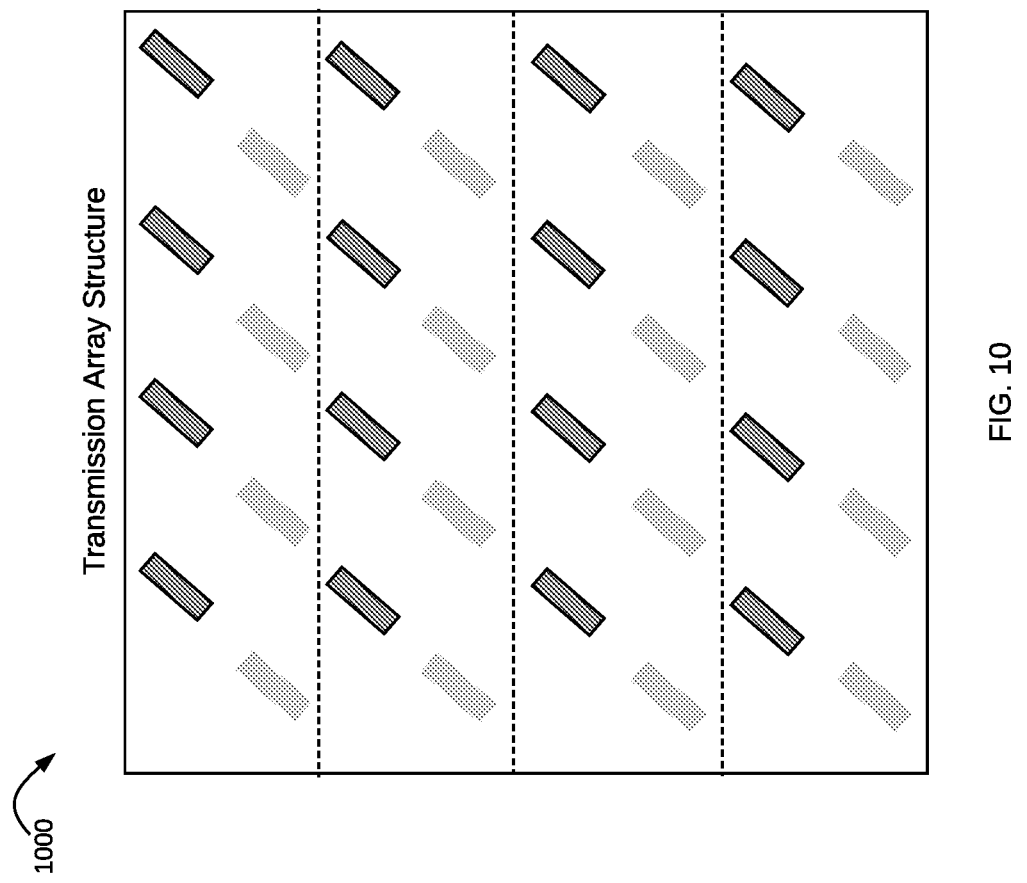

It is appreciated that the slots in transmission array structures 600 and 800 are shown to have a rectangular shape for illustration purposes only. Slots may be designed to have different shapes, orientations and be of different sizes, depending on the desired application. There could also different variations in the number of slots. A transmission array structure may be a 4×4 array, an 8×8 array, a 16×16 array, a 32×32 array, a 4×8 array, a 4×16 array, an 8×32 array, and so on. An example of such a transmission array is shown in FIG. 9, where the transmission array structure 900 has 4 superelements and 8 slots in each superelement. and is therefore an 8×4 array. As illustrated, the slots in transmission array structure 900 have an oval shape and different sizes, with slots in a row having one size, e.g., slot 902, and the slots in an adjacent row, e.g., slot 904, having another size. Slots may be smaller at the edges of the transmission array structure 900 to taper a transmission signal. Further, slots may also be oriented at an angle with respect to a row of a transmission array structure, as shown in FIG. 10, with transmission array structure 1000. The position, shapes, configuration and so forth are destined to achieve a desired result. These form the radiation patterns transmitted and received and affect the gain, side lobes and other characteristics of EM signals.

Figure 11:
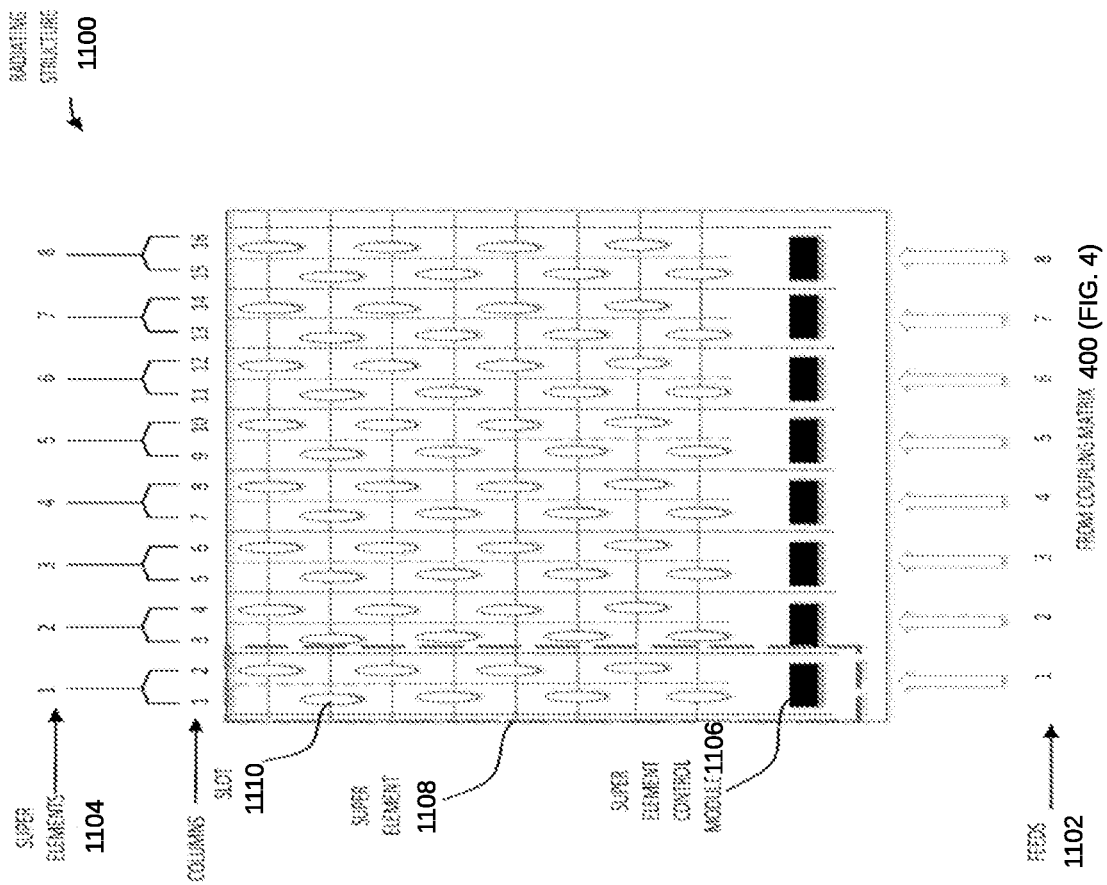
FIG. 11 illustrates a radiating structure with eight (8) superelements and sixteen (16) individual transmission lines in accordance with various examples.

Two adjacent transmission lines in a transmission array structure form a superelement. FIG. 11 illustrates a radiating structure 1100 with eight (8) superelements and sixteen (16) individual transmission lines in accordance with various examples. The feeds 1102 from coupling matrix 400 of FIG. 4 provide transmission signals to each superelement 1104. Each superelement 1104 includes a superelement control module 1106, which may include a reactance control mechanism and an impedance matching mechanism. The superelement 1108 includes multiple slots 1110 along its length. The individual transmission lines are organized in columns 1 to 16. In the illustrated example, the transmission lines are defined by vias incorporated through the substrate so as to maintain a signal within a transmission line.

The superelement control module 1106 includes an impedance matching element, e.g., impedance matching element 126 of FIG. 1, that functions as a coupling mechanism. The superelement control module 1106 also includes a phase control element, e.g., phase control element 128 of FIG. 1, wherein the phase of transmission line of column 1 is 90° different from the phase of transmission line of column 2. Each superelement 1104 increases the number of phase changes in the transmission array to reduce the control required for phase adjustment. In a conventional antenna, a set of phase shifters adjust the phase of each transmission line or each antenna element. The present examples provide an array of radiating unit cells wherein a superelement is a subset of the array. Each superelement provides a transmission signal to each of the unit cells associated with the superelement, and the superelement control module 1106 adjusts the phase of each transmission line within the superelement. The superelement control module 1106 includes a coupler circuit and a variable capacitor. The coupler provides a 90° fixed phase shift between transmission lines within the superelement. One control change to the variable capacitor changes the phase of both transmission lines. Alternate examples may incorporate any number of transmission lines within a superelement, wherein the superelement control is a single control achieving multiple changes in phase.

Figure 12:
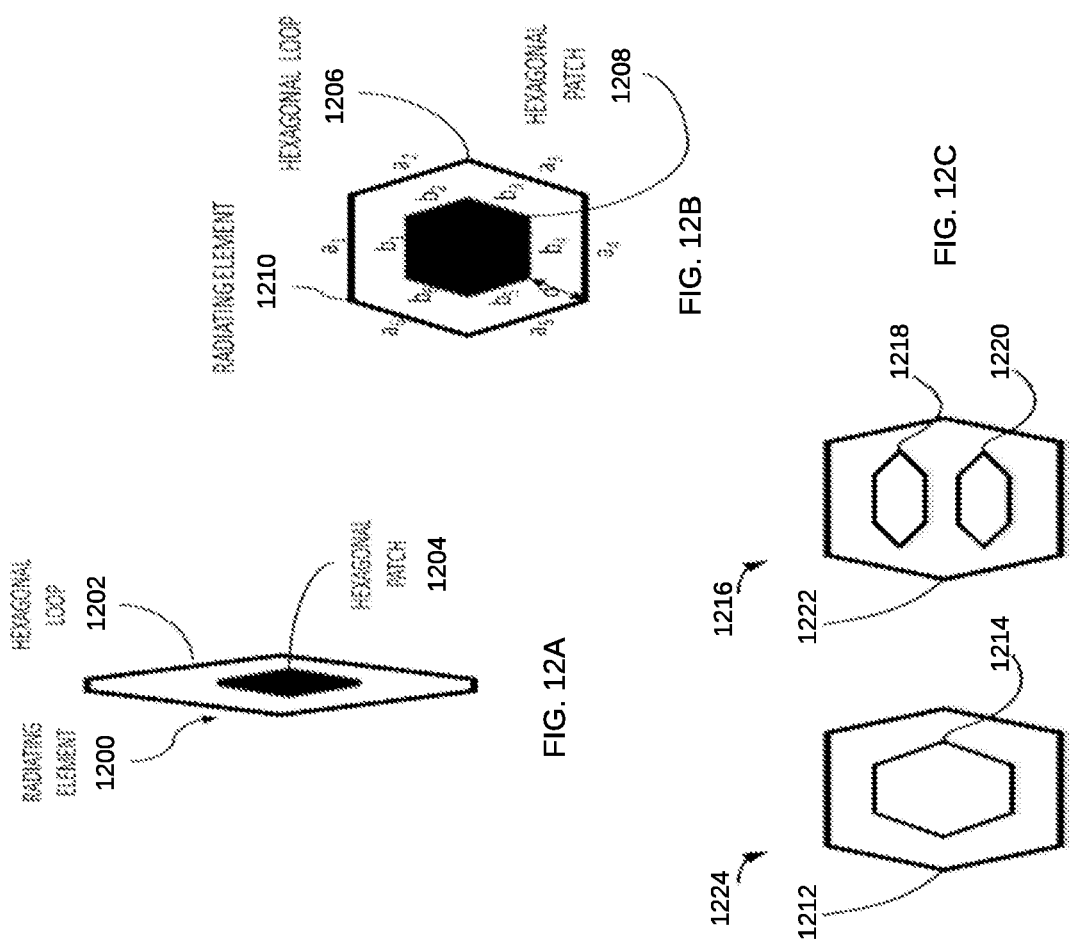
FIGS. 12A-C are schematic diagrams of radiating array elements for use in a radiating structure as in FIG. 1 in accordance with various examples.

Attention is now directed to FIGS. 12A-C, which are schematic diagrams of radiating array elements for use in a radiating structure as in FIG. 1 in accordance with various examples. Radiating array structure 124 includes multiple individual elements, e.g., radiating element 1200, to form a lattice structure of hexagonal elements. The radiating array structure 124 is designed to operate in coordination with the transmission array structure 122 of FIG. 1, wherein individual radiating elements correspond to individual slots within the transmission array structure 122. Each hexagonal element is designed to radiate at the transmission signal frequency, wherein each hexagonal element is of the same shape and size. Each slot in a transmission array structure and corresponding radiating element in a radiating array structure have a fixed relationship, wherein the center of each slot corresponds to the center of the radiating patch of a radiating element. In this way, the radiating structure 124 provides a wireless signal, such as a radar signal.

As illustrated, the radiating elements' hexagonal shape provides design flexibility for a densely packed array. Each radiating element has an outer geometric shape, referred to herein as a hexagonal conductive loop, e.g., loop 1202, and an inner geometric shape that is referred to as a hexagonal conductive patch, e.g., patch 1204. The hexagonal shape provides the flexibility of design for a densely packed array, and the parametric shape enables computational design that can be easily scaled and modified while maintaining the basic shape of the hexagon. In this example, the dimensions of the shapes are geometrically similar and their relationship is proportionally maintained.

As illustrated in FIG. 12B, the sides of the hexagonal loop 1206 are designated by reference letter "a" and the sides of the hexagonal patch 1208 are designated by reference letter "b". The hexagonal patch 1208 is centered within the hexagonal loop 1206. Corresponding points on the perimeters of the loop and patch are equidistant from each other, specifically in this example, at a distance designated by "d". This configuration is repeated to form a densely packed lattice.

FIG. 12C illustrates a double-loop radiating element, or MTM unit cell 1224, having an outer loop 1212 and an inner loop 1214. The shape of the unit cell 1224 is hexagonal according to design choices described hereinabove. Alternate examples may include multiple concentric inner loops, or multiple loops positioned separately within an outer loop, such as unit cell 1216. The inner radiating structure of unit cell 1216 are hexagonal loops 1218-1220 within outer loop 1222, however, they may be configured as other shapes and configurations. There is a large variety of hexagonal shapes and configurations that may be implemented, both symmetric and asymmetric. Note also that although illustrated as having a hexagonal shape, a radiating element may be of another shape, e.g., circular, rectangular, etc., depending on the application. A variety of sizes, configurations and designs may be implemented.

In various examples, a radiating element is a metamaterial element. A metamaterial is an artificially structured element used to control and manipulate physical phenomena, such as the electromagnetic ("EM") properties of a signal including its amplitude, phase, and wavelength. Metamaterial structures behave as derived from inherent properties of their constituent materials, as well as from the geometrical arrangement of these materials with size and spacing that are much smaller relative to the scale of spatial variation of typical applications. A metamaterial is not a tangible new material, but rather is a geometric design of known materials, such as conductors, that behave in a specific way. A metamaterial element may be composed of multiple microstrips, gaps, patches, vias, and so forth, having a behavior that is the equivalent to a reactance element, such as a combination of series capacitors and shunt inductors. Various configurations, shapes, designs and dimensions may be used to implement specific designs and meet specific constraints. In some examples, the number of dimensional degrees of freedom determines the device characteristics, wherein a device having a number of edges and discontinuities may model a specific-type of electrical circuit and behave in a similar manner. In this way, a radiating element radiates according to its configuration. Changes to the design parameters of a radiating element result in changes to its radiation pattern. Where the radiation pattern is changed to achieve a phase change or phase shift, the resultant structure is a powerful antenna or radar, as small changes to the radiating element can result in large changes to the beamform.

In various examples, a metamaterial radiating element has some unique properties. These properties may include a negative permittivity and permeability resulting in a negative refractive index; these structures are commonly referred to as left-handed materials ("LHM"). The use of LHM enables behavior not achieved in classical structures and materials, including interesting effects that may be observed in the propagation of electromagnetic waves, or transmission signals. Metamaterials can be used for several interesting devices in microwave and terahertz engineering such as antennas, sensors, matching networks, and reflectors, such as in telecommunications, automotive and vehicular, robotic, biomedical, satellite and other applications. For antennas, metamaterials may be built at scales much smaller than the wavelengths of transmission signals radiated by the metamaterial. Metamaterial properties come from the engineered and designed structures rather than from the base material forming the structures. Precise shape, dimensions, geometry, size, orientation, arrangement and so forth result in the smart properties capable of manipulating EM waves by blocking, absorbing, enhancing, or bending waves.

Figure 13:
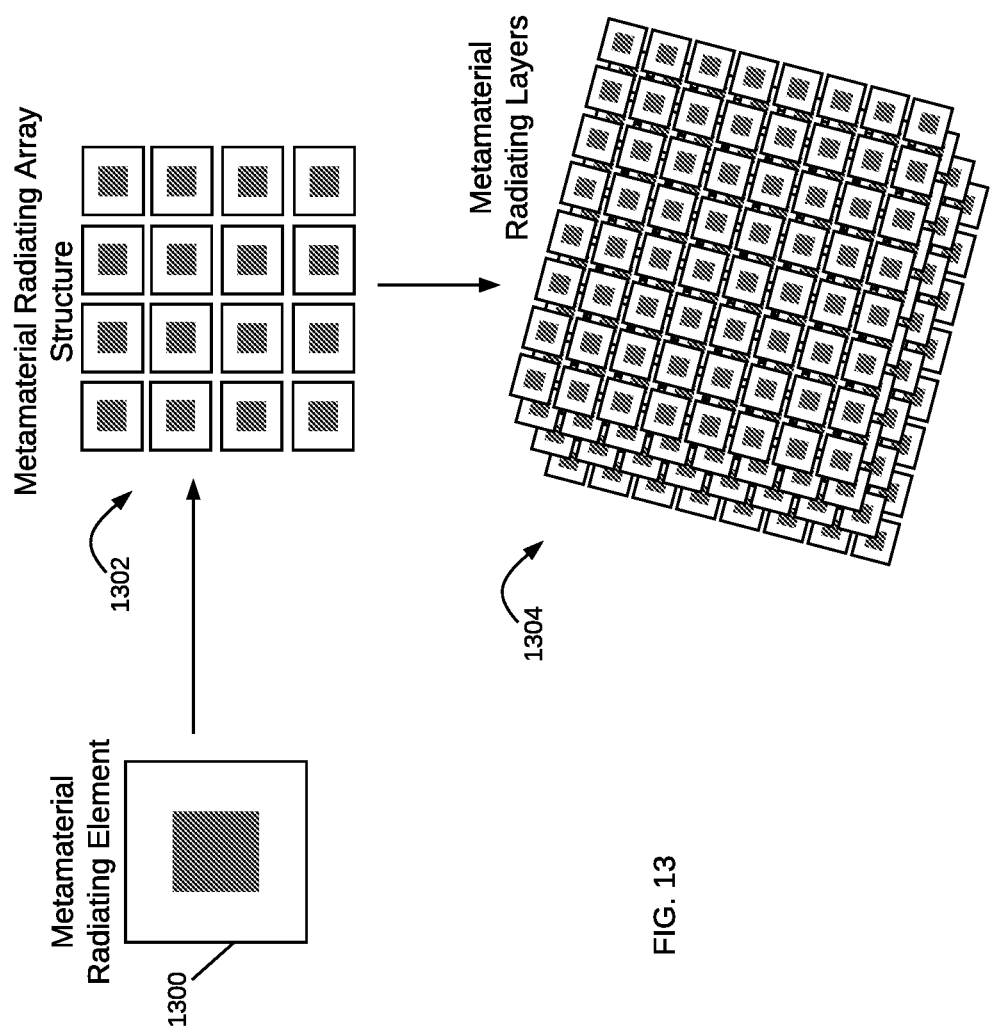
FIG. 13 is a schematic diagram of a metamaterial radiating element, a single layer radiating array structure and a multi-layer radiating array structure in accordance with various examples.

In FIG. 13, a metamaterial radiating element 1300 is shown to have a rectangular shape. The metamaterial radiating element 1300 can be arranged in a radiating array structure 1302 much like the radiating array structure 124 in FIG. 1. Note that in structure 1302, the radiating elements are spaced apart by a distance that is determined based on the desired radiation pattern and beam characteristics. Note also that a radiating array structure may be implemented as a layer in a multi-layer radiating array, such as metamaterial radiating layers 1304 having 4 layers of 8×8 radiating arrays. The number of elements in an array, the shape of the elements, the spacing between the elements, and the number of layers can all be designed to match the parameters of a corresponding transmission array structure and achieve a desired radiation pattern and performance in a radiating structure.

In some examples, the lattice structure of a radiating array structure is formed by an array of individual radiating elements having dimensions that allow control of the phase of a radiating transmission by changing an effective reactance of the element through application of a voltage to a varactor. The radiating element may take any of a variety of shapes and configurations and be formed as conductive traces on a substrate including a dielectric layer. The varactor control may be thought of as a reactance control array, wherein each of the varactors is controlled by an individual reverse bias voltage resulting in an effective capacitance change to at least one individual radiating element. The varactor then controls the phase of the transmission of each radiating element, and together the entire radiating array structure transmits am electromagnetic radiation beam having a desired phase.

Figure 14:
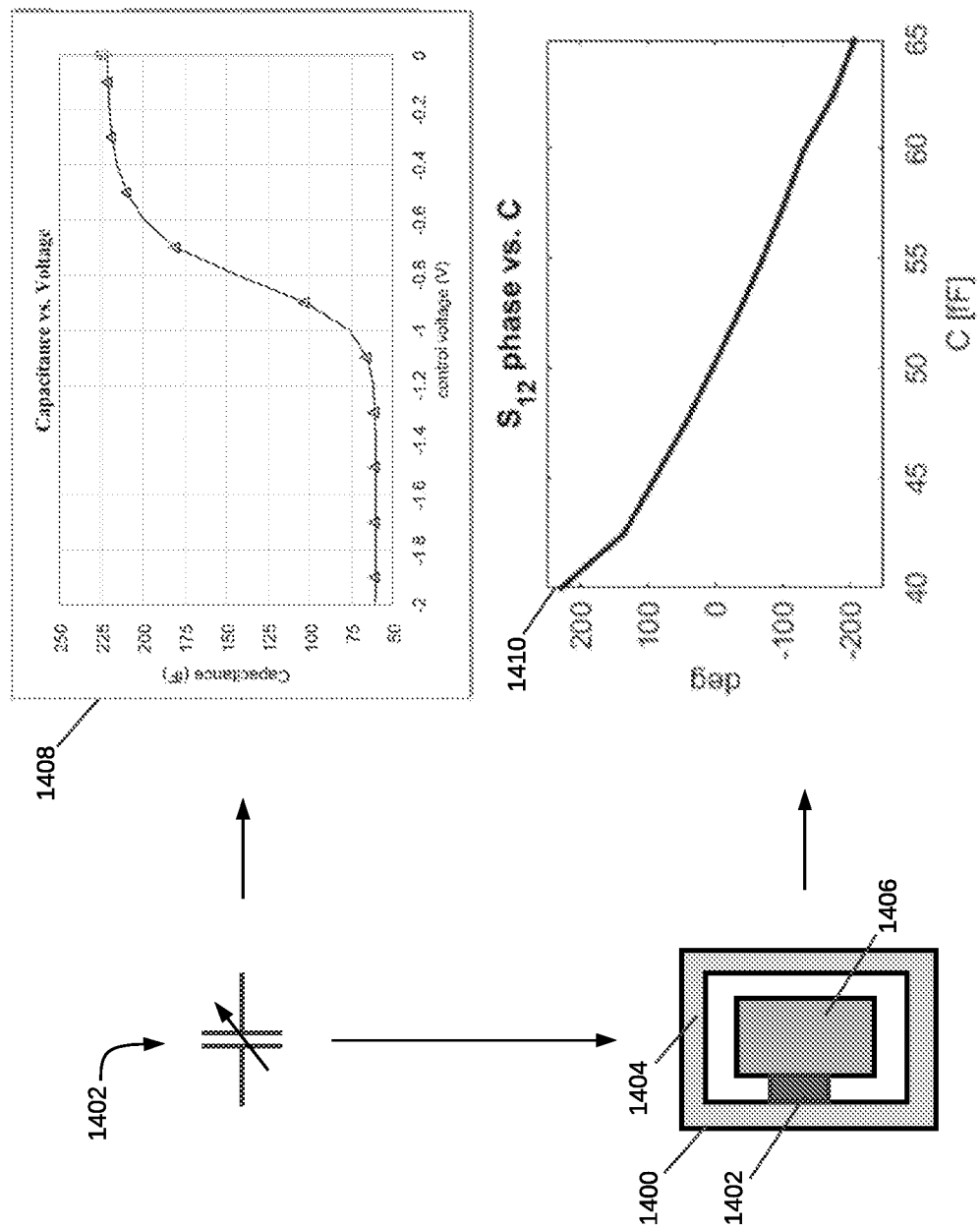
FIG. 14 illustrates an example radiating element with an integrated reactance control device.

FIG. 14 illustrates an example radiating element with an integrated varactor. Radiating element 1400 is illustrated having a conductive outer portion or loop 1404 surrounding a conductive area 1406 with a space in between. Radiating element 1400 may be configured on a dielectric layer, with the conductive areas and loops provided around and between different radiating elements. A voltage controlled variable reactance device 1402, e.g., a varactor, provides a controlled reactance between the conductive area 1406 and the conductive loop 1404. The controlled reactance is controlled by an applied voltage, such as an applied reverse bias voltage. The change in reactance changes the behavior of the radiating element 1400, enabling a radiating array structure to provide focused, high gain beams directed to a specific location.

Graph 1408 illustrates how the varactor 1402's capacitance changes with the applied voltage. The change in reactance of varactor 1402 changes the behavior of the radiating element 1400, enabling a radiating array structure 124 to provide focused, high gain beams directed to a specific location. Each beam may be directed to have a phase that varies with the reactance of the varactor 1402, as shown in graph 1410 illustrating the change in phase with the change in reactance of varactor 1402. With the application of a control voltage to the varactor 1402, the radiating element 1400 is able to generate beams at any direction about a plane.

Figure 15:
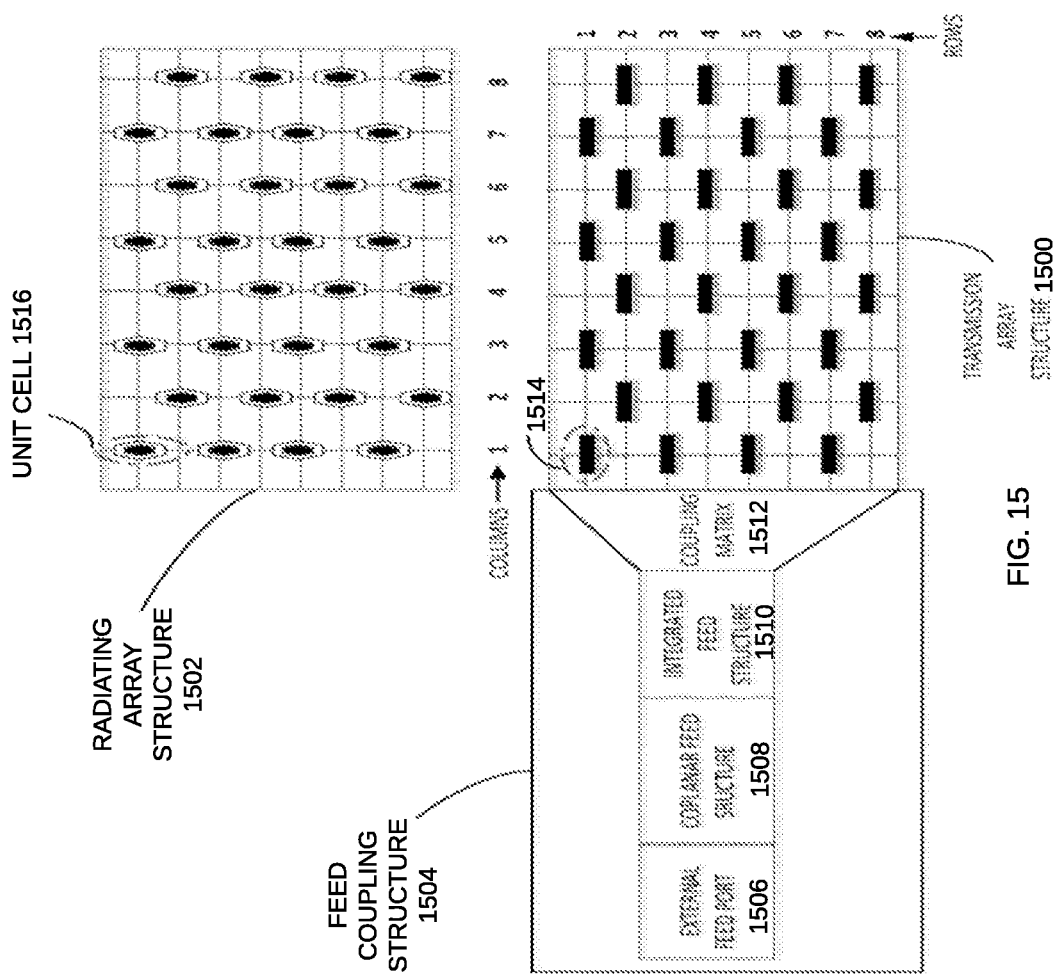
FIG. 15 illustrates a radiating structure coupled to a transmission array structure and a feed coupling structure as in FIG. 1 and in accordance with various examples.

FIG. 15 illustrates a radiating structure coupled to a transmission array structure and a feed coupling structure as in FIG. 1 and in accordance with various examples. There is a graph superimposed over the transmission array 1500 and the radiating array structure 1502 to show relationships. The graph identifies columns and rows. The slots of the transmission array structure 1500 are positioned approximately perpendicular to corresponding unit cells of the radiating array structure 1502. The radiating array structure 1502 is built on a substrate dielectric material sandwiched between conductive layers.

The feed coupling structure 1504 includes an external feed port 1506, a coplanar feed structure 1508, an integrated feed structure 1510, and a coupling matrix 1512. The external feed port 1506 receives a transmission signal and is adapted to couple to a source, such as a coaxial cable or internal connector. In some examples, the feed is through a circuit board or an Application Specific Integrated Circuit ("ASIC"), where the transceiver 106 of FIG. 1 is coupled to the external feed port 1506, with the word external indicating external to the feed coupling structure 1504. The external feed port 1506 is coupled to a coplanar feed structure 1508, such as in the illustrated example. The coplanar feed structure 1508 is constructed to direct the transmission signal toward the transmission array structure 1500 through an integrated feed structure 1510 and a coupling matrix 1512.

The transmission lines are defined by horizontal lines formed by vias in the substrate and create transmission paths for the transmission signal to travel. The vias are spaced so as to maintain the transmission signal with a row, or transmission line. Within each row, the slots are formed lengthwise throughout the row. As illustrated, row 1 includes four (4) slots. These are offset from the slots of row 2, so as to accommodate the hexagonal structure of the lattice of radiating array structure 1502. In this configuration, the slots correspond positionally to the radiating elements of the radiating array structure 1502. The signal radiates through a slot 1514 to an element, such as to a hexagonal radiating element 1516, which then transmits the signal through the environment.

The structures of FIG. 15 illustrate the layout of a portion of radiating structure 102 of FIG. 1 on composite of multiple layers, wherein the layout design is provided for clarity and understanding of the reader. As illustrated, the transmission paths of the transmission array structure 1500 are defined by the via paths bordering each row. The coupling matrix 1512 divides the transmission paths by the configuration of vias as illustrated, and the coupling paths are also defined by vias, or holes through the substrate, plated or lined with a conductive material, to connect two individual conductive portions of the composite layer. This layout may be fabricated as a single component having multiple layers and with placement locators, or holes, to position the lattice structure correctly within the composite layer. As discussed hereinabove, each of the slots in the transmission array structure is placed proximate a corresponding one of the radiating elements of the radiating array structure 1502, such proximity may be below or underneath transmission array structure 1500 from the illustrated perspective.

The radiating array structure 1502 is shown with individual hexagonal elements corresponding to structures of the transmission array structure 1500 according to various examples. The location of a discontinuity in transmission array structure 1500 with respect to its corresponding unit cell in radiating array structure 1502 determines the radiation parameters of the beam from the radiating structure. Where the discontinuity and unit cell are directly aligned, the transmission signal energy will be different than in a configuration where the discontinuity and unit cell have a different alignment or configuration, such as where the position of the discontinuity is offset from the center of the unit cell. Positioning of the two with respect to each other changes the signal energy from that given unit cell and therefore impacts the entire radiation beam. The shape of the unit cell also impacts the type of beam formed. Each shape has a different radiation behavior, and that behavior changes with the electrical characteristics of the unit cell. For example, a phase control element used to change the reactance of the unit cell 1516 will result in a phase shift of the signal radiated by that unit cell. By controlling the electrical parameters and behavior of each of the array of unit cells, the present invention controls and directs the beam formation of the radiating structure 102, such as an antenna for radar or communications.

In the configuration illustrated in FIG. 15, the transmission array 1500 may also be considered a feed structure or feed array. When the transmission signal is received at the external feed port 1506, which may receive a signal internal to the system (but is labeled as an external feed port with respect to the antenna structure of this example), the transmission signal will propagate through the coplanar feed structure 1508 to the integrated feed structure 1510, through the coupling matrix 1512, and through each row of the transmission array 1500. The signal then reaches the radiating array structure 1502 and is radiated into the air. Each slot and radiating element pair has a fixed relationship. In some examples, the center of a slot of a row of the transmission array structure 1500, such as slot 1514 of row 1, column 2 corresponds to the center of a radiating patch of radiating element 1516. In this way, the radiating structure provides phase-shifting capabilities. As a signal propagates along the path of row 1, it encounters a discontinuity at slot 1514, from which the signal radiates and reaches radiating element 1516. In operation, the radiating signals from the radiating elements of the lattice structure of radiating array structure 1502 form a radiating beam. In this way, the antenna may be considered to include the transmission array structure 1500 and the lattice, radiating array structure 1502.

The present invention enables beam forming and beam steering using this type of configuration. The figures and drawings are not necessarily drawn to scale, but rather are sized for clarity of understanding. For example, in the example of FIG. 15, the size of the unit cells, such as cell 1516, illustrate the shape of the loop and patch, and provide a distance between each unit cell. In some examples, the hexagonal shapes are configured with little space between, and in other examples, adjacent hexagonal loops may share a side.

Figure 16:
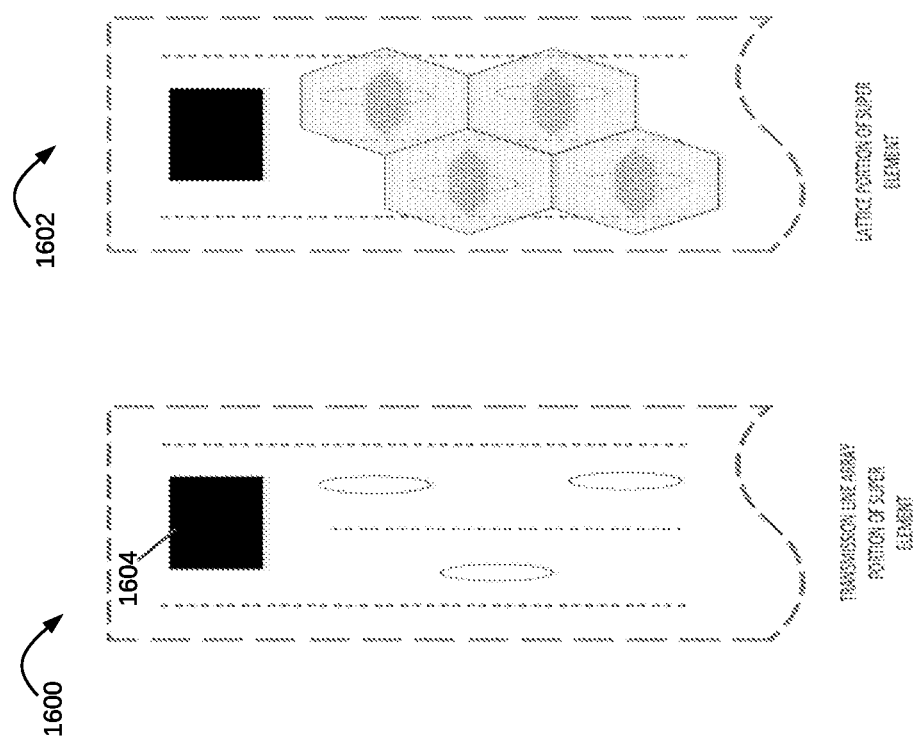
FIG. 16 is a detailed image of a superelement, illustrating the transmission line array position of the superelement and the overlay of a lattice portion to the superelement in accordance with various examples.

FIG. 16 is a detailed image of a superelement illustrating the transmission line array position of the superelement, and the overlay of a lattice portion to the superelement. There are a variety of configurations of superelements that may be implemented. A composite layer as described herein, having a radiating array structure appended to the composite structure, includes a dielectric layer to separate the transmission line conductive layer from the lattice of the radiating array structure. The feed portion includes the external feed port, the coplanar feed structure, the integrated feed structure and the coupling matrix, and may be formed in one layer, having the lattice layer positioned at one end on the feed portion. In various examples, each radiating element in a radiating array structure has a phase control element positioned between a patch and loop, or a patch and inner patch. In some examples, not all radiating elements have a phase control element. In some other examples, the position of the phase control element is positioned in different locations of a radiating element structure. The phase control elements are positioned to facilitate phase changes in the transmitted radiation beam or beams from the radiating array structure.

In various examples, a phase control element is implemented with a varactor diode or other device to act as a voltage-controlled capacitor or other device to change the electrical parameters of a radiating element, such as an MTM element. Each phase control element, e.g., phase control element 1604, is controlled by an antenna controller, which may be a bias circuit to control a varactor diode. Alternate examples may implement any of a variety of devices and configurations to achieve the electrical and/or electro-magnetic properties of the radiating element. The antenna controller, e.g., antenna controller 108 of FIG. 1, controls the bias voltage applied to the phase control element, which changes the reactance of the phase control element and results in a change in the effective capacitance of the radiating element. The phase control element may be also referred to as a variable capacitance element. There may be any number of phase control elements in the radiating elements of an array so as to achieve the desired effective reactance of radiating elements to achieve a given beam formation and to steer the beam. The change in effective reactance of the radiating element acts to shift the phase of the signal transmitted from the radiating array structure.

As described herein, there are many different configurations to change the electrical parameters of an MTM unit cell so as to change the radiation pattern. The phase control element may be configured within a unit cell, or it may be configured within a transmission line array or the feed structure. The present invention is applicable in a variety of technical areas, including self-driving cars, truck platooning, drones, navigational devices, hospital monitoring devices, research and nanotechnology monitoring, cellular communication systems and more. The present inventions are applicable for wireless transmission signals used for communication and for object detection. In some embodiments, the lattice structure of a radiating array structure is formed by an array of individual MTM elements having dimensions that allow control of the phase of a radiating transmission by changing an effective reactance of the MTM element through application of a voltage to a varactor. The MTM element may take any of a variety of shapes and configurations.

The MTM elements may be formed as conductive traces on a substrate including a dielectric layer. The feed structure provides the transmission signal energy to each of the array elements by way of multiple parallel transmission paths. While the same signal is provided to each MTM element, the antenna controller controls the phase of each MTM element by a variable capacitance element or varactor. The varactor control may be thought of as a capacitance control array, wherein each of the varactor diodes is controlled by an individual reverse bias voltage resulting in an effective capacitance change to at least one individual MTM element. The varactor then controls the phase of the transmission of each MTM element, and together the entire MTM antenna array transmits am electromagnetic radiation beam. Control of reverse bias voltages or other controls of the capacitance control element may incorporate a Digital-to-Analog converter ("DAC") device.

The examples disclosed herein provide a multi-layer radiating structure having structures formed in several of the layers. These features may be viewed from a variety of perspectives. FIG. 17A is a cross-section of a transmission line array portion of a radiating structure 1700 illustrating slots integrated into a transmission line. The transmission line conductive layer 1702 is a portion of the feed layer. Conductive portions are illustrated in black, while the discontinuities, or slots, are illustrated in white. Each slot 1704 corresponds to a unit cell 1714. In the radiating structure 1700, slots 1704 are evenly distributed along the length of the transmission line. The composite structure includes conductive layer 1706, substrate layer 1708, transmission line conductive layer 1702 in which the slots 1704 are formed, and a lattice layer 1712 in which the unit cells 1714 are built. The cut-away of unit cell 1714 provides the position of the cell through the composite layers. The transmission line conductive layer 1702 includes a plurality of slots 1704 integrated into a transmission line. The slots 1704 correspond to unit cells 1714, such that the center of a slot is approximately aligned with the center of a unit cell. The even distribution of slots 1704, having equal inter-slot spacing, allows a transmission signal to radiate through the slot 1704 to the unit cell 1714 with a specific radiation energy.

In the examples described herein, each discontinuity, or slot, corresponds to a unit cell. Alternate examples may employ multiple discontinuities for one unit cell. There are a variety of configurations wherein the transmission signal radiates through a discontinuity and reaches a unit cell, wherefrom the transmission signal radiates. As in FIG. 17A, the cross-section is taken through the center of unit cell 1714, as indicated by the cut-away arrows. This slice provides a view as to where each slot is positioned with respect to a corresponding unit cell 1714 as they are separated by a dielectric layer 1710. Each of the discontinuities of this row are equidistant from each other and have a spacing of $d_s$. Alternate examples may position the slots 1704 so they are not directly under the unit cells 1714, while maintaining a consistent inter-slot spacing $d_s$.

FIG. 17B illustrates an asymmetric or uneven inter-slot spacing configuration of a radiating structure 1730 that is a composite of several layers. The spacing differences between slots 1716 result in different radiation energy through the slots to the unit cell radiating element, e.g., cell 1718. The slots 1716 are integrated into a transmission line. As illustrated, the spacing between adjacent slots 1716 are not equal and the slots are unevenly distributed along the transmission line. The position of each slot 1716 with respect to a corresponding unit cell 1718 is not necessarily the same as the positional relationship of an adjacent slot. In other words, the inter-slot spacings are not uniform. As illustrated, a first inter-slot spacing is $d_1$ and another inter-slot spacing is $d_i$, wherein $d_1 \neq d_i$. Each inter-slot spacing may be unique, and in some examples, the spacing forms a pattern, such as where the spacing toward the perimeter edges of a transmission line are approximately consistent but different from the spacing toward the center of a transmission line.

Figure 18A:
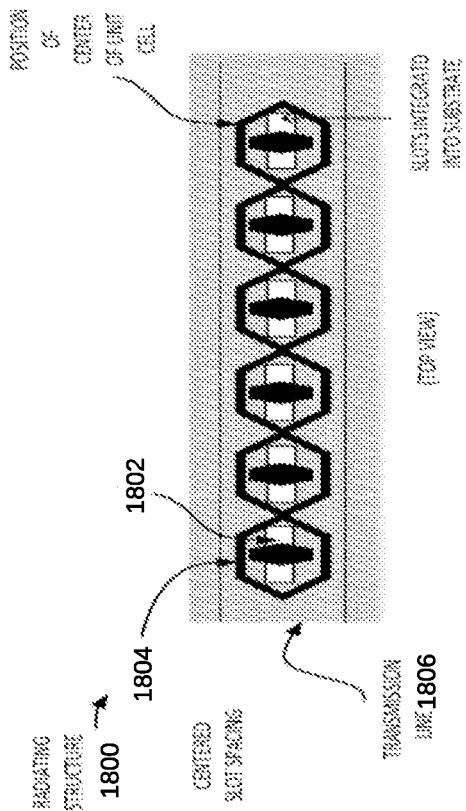
FIGS. 18A-B illustrate a radiating structure from a top perspective in accordance with various examples.
Figure 18B:
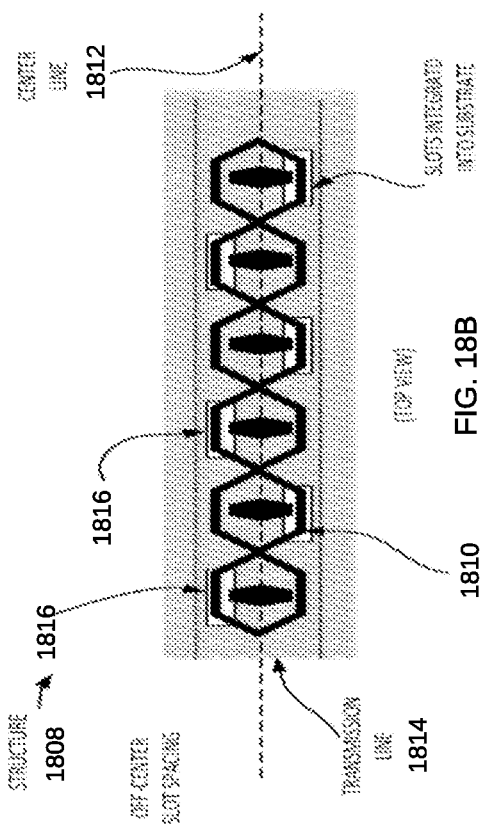

FIGS. 18A-B provide another view of the radiating structure 1800 from a top perspective. The slots 1802 are approximately centered with respect to each unit cell 1804. The slots 1802 and the unit cells 1804 are aligned along the length of transmission line 1806. In FIG. 18B, the slots 1810 are positioned off a center line 1812 of the transmission line 1814. A portion of the lattice, including unit cells 1816 are positioned along the length of the transmission line 1814. The discontinuities of the transmission line 1814 are positioned off-center and are arranged and positioned to achieve a desired radiation energy to unit cells 1816. In the illustrated example, adjacent slots are positioned on opposite sides of center line 1812, wherein the center line 1812 is superimposed over the top view of radiating structure 1808 for clarity of understanding.

Attention is now directed to FIG. 19, which shows a flowchart for manufacturing an active radiating structure in accordance with the various examples described hereinabove. First, a substrate is configured to have a dielectric layer on a conductive layer (1900). Next, a coupling matrix of conductive material is formed on the dielectric layer (1902). The coupling matrix is formed by placing vias through the dielectric layer to the conductive layer. The vias are lined with conductive material to form a conduit for a transmission signal to travel in the substrate. Once the coupling matrix is built, the transmission paths are formed (1904) and the slots are carved out within each of the transmission paths (1906). Adjacent transmission lines form a superelement, wherein an adjacent transmission line pair has a specific phase difference, such as a 90° phase difference with respect to each other. Each superelement is configured with a phase control module, which may include an impedance matching element and a phase control element (1908). A lattice structure of radiating elements is then formed on a second dielectric layer (1910) and positioned proximate the superelements (1912) to allow for a correspondence between each radiating element and a slot in a transmission path. As described above, the lattice structure is a single or multi-layer array of radiating elements that can be designed as metamaterial elements with a desired shape and configuration to achieve a desired radiation pattern and performance.

The present inventions provide methods and apparatuses for radiating a signal. The methods and apparatuses are applicable in a variety of technical areas, including self-driving cars, truck platooning, drones, navigational devices, hospital monitoring devices, research and nanotechnology monitoring, cellular communication systems and more. The radiating structure disclosed hereinabove with an array of radiating elements, a transmission array and a feed structure is capable of generating beams at desired phase shifts. The feed structure distributes the transmission signal throughout the transmission array, wherein the transmission signal propagates along the rows of the transmission array and slots are positioned along each row. The slots are positioned to correspond to radiating elements of a radiating array structure. The radiating elements have a desired shape that is conducive to dense configurations optimizing the use of space and reducing the size of a conventional antenna. In various examples, radiating elements include voltage-controlled reactance controlled devices for generating phase shifts according to the control voltage.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A radiating structure, comprising:
   a transmission array structure having a plurality of transmission paths, each transmission path having a plurality of slots and a pair of adjacent transmission paths forming a superelement, the superelement comprising a phase control module;
   a radiating array structure having a plurality of radiating elements configured in a lattice, each radiating element corresponding to at least one slot from the plurality of slots and the radiating array structure positioned proximate the transmission array structure; and
   a feed coupling structure coupled to the transmission array structure and adapted for propagation of a transmission signal to the transmission array structure, the transmission signal radiated through at least one superelement and at least one of the plurality of radiating elements and having a phase controlled by the phase control module in the at least one superelement.

2. The radiating structure of claim 1, wherein the feed coupling structure comprises a coupling matrix adapted to distribute the transmission signal to the plurality of transmission paths, each transmission path receiving a proportional share of the transmission signal.

3. The radiating structure of claim 2, wherein the coupling matrix comprises a plurality of impedance-matched transmission lines formed by vias on a substrate.

4. The radiating structure of claim 2, wherein the proportional share tapers a transmission signal at certain points of the transmission array structure.

5. The radiating structure of claim 1, wherein the feed coupling structure comprises an external feed port adapted to receive the transmission signal from a signal source.

6. The radiating structure of claim 1, wherein the feed coupling structure further comprises a coplanar feed structure and an integrated feed structure.

7. The radiating structure of claim 1, wherein the transmission array structure is organized in a plurality of rows and columns and wherein the slots of adjacent rows are offset from one another by one column length.

8. The radiating structure of claim 1, wherein each radiating element comprises a metamaterial radiating element and corresponds to one or more slots in the transmission array structure.

9. The radiating structure of claim 1, wherein the phase control module in a superelement comprises an impedance matching element and a phase control element.

10. The radiating structure of claim 1, wherein a portion of the slots in the plurality of slots are smaller at edges of the transmission array structure to taper the transmission signal.

11. The radiating structure of claim 1, wherein the transmission signal comprises an FMCW signal in a radar.

12. A wireless radiating structure, comprising:
    a composite layer formed of a dielectric layer on a conductive layer, the dielectric layer having a feed coupling structure adapted to receive and propagate a transmission signal to a transmission array structure having a plurality of slots arranged in superelements, each superelement comprising a phase control module; and
    a radiating array structure of a plurality of radiating elements, each radiating element corresponding to at least one slot in the transmission array structure adapted to radiate the transmission signal.

13. The wireless radiating structure of claim 12, wherein the radiating array structure is formed on a second dielectric layer positioned above and proximate the transmission array structure.

14. The wireless radiating structure of claim 12, wherein the at least one radiating element is a metamaterial radiating element having a conductive outer loop and a conductive patch circumscribed within the conductive outer loop and wherein a reactance control device is placed between the conductive outer loop and the conducive patch.

15. The wireless radiating structure of claim 12, wherein the radiating array structure comprises a multi-layer radiating array structure, wherein each layer comprises an array of radiating elements.

16. The wireless radiating structure of claim 12, wherein a portion of the plurality of radiating elements is configured into a subarray of radiating elements.

17. The wireless radiating structure of claim 12, wherein the plurality of slots is evenly distributed among the superelements.

18. A method for manufacturing a radiating structure, comprising:
    configuring a substrate having a first dielectric layer on a conductive layer;
    forming a coupling matrix of conductive material on the first dielectric layer;
    forming a plurality of transmission paths on the first dielectric layer for propagation of a transmission signal;
    forming a plurality of slots within each of the transmission paths, wherein an adjacent pair of transmission paths forms a superelement;
    configuring a plurality of superelements, each superelement comprising a phase control module; and
    forming a radiating array structure on a second dielectric layer, the radiating array structure comprising a plurality of radiating elements arranged in a lattice and corresponding to the plurality of slots adapted to radiate the transmission signal at a phase controlled by a phase control module.

19. The method of claim 18, wherein the coupling matrix comprises a first set of vias through the first dielectric layer to the conductive layer to form a plurality of impedance-matched transmission lines.

20. The method of claim 18, wherein the transmission paths comprise a second set of vias through the first dielectric layer to the conductive layer.

* * * * *